US010712270B2

(12) United States Patent
Matoba

(10) Patent No.: US 10,712,270 B2
(45) Date of Patent: Jul. 14, 2020

(54) DIGITAL HOLOGRAPHIC MICROSCOPE

(71) Applicant: NATIONAL UNIVERSITY CORPORATION KOBE UNIVERSITY, Kobe-shi, Hyogo (JP)

(72) Inventor: Osamu Matoba, Hyogo (JP)

(73) Assignee: National University Corporation Kobe University, Hyogo (JP)

( * ) Notice: Subject to any disclaimer, the term of this patent is extended or adjusted under 35 U.S.C. 154(b) by 0 days.

(21) Appl. No.: 16/340,506

(22) PCT Filed: Oct. 11, 2017

(86) PCT No.: PCT/JP2017/036894
§ 371 (c)(1),
(2) Date: Apr. 9, 2019

(87) PCT Pub. No.: WO2018/070451
PCT Pub. Date: Apr. 9, 2018

(65) Prior Publication Data
US 2019/0250104 A1 Aug. 15, 2019

(30) Foreign Application Priority Data
Oct. 11, 2016 (JP) ................. 2016-200457

(51) Int. Cl.
G02B 21/16 (2006.01)
G01N 21/64 (2006.01)
(Continued)

(52) U.S. Cl.
CPC ......... *G01N 21/6458* (2013.01); *G01N 21/64* (2013.01); *G02B 5/18* (2013.01);
(Continued)

(58) Field of Classification Search
CPC ............. G01N 21/645; G01N 21/6458; G01N 21/6452; G01N 21/6456; G01N 21/64;
(Continued)

(56) References Cited

U.S. PATENT DOCUMENTS 7,009,700 B2 * 3/2006 Dubois .............. G01N 21/6458
356/317
2004/0156098 A1  8/2004 Dubois et al.
(Continued)

FOREIGN PATENT DOCUMENTS

JP  2000-98243 A   4/2000
JP  2004-538451 A  12/2004
(Continued)

OTHER PUBLICATIONS

Quan, Xiangyu, et al., "Feasibility assessment of hybrid digital holographic microscope for fluorescence and phase imaging", Optics and Photonics Japan, No. 6, p. 15, 2014.
(Continued)

*Primary Examiner* — David P Porta
*Assistant Examiner* — Fani Boosalis
(74) *Attorney, Agent, or Firm* — Ogilvie Law Firm

(57) ABSTRACT

A digital holographic microscope in which two digital holographic microscopes for detecting a fluorescence image and a phase image, respectively, are combined to be able to three-dimensionally measure a fluorescence image and a phase image at the same time, and perform measurement at a high SN ratio in all the polarization states including random light polarization. A first holographic optical system that, by using laser light, acquires a phase three-dimensional image due to interference light generated by superimposing object light which passes through a sample stage and reference light which does not pass through the sample stage onto each other. A second holographic optical system that, by (Continued)

using fluorescent excitation light, acquires a fluorescence three-dimensional image due to a fluorescence signal light, wherein phase measurement by the first holographic optical system and fluorescence measurement by the second holographic optical system are performed at the same time.

17 Claims, 14 Drawing Sheets

(51) Int. Cl.
*G02B 5/18* (2006.01)
*G03H 1/00* (2006.01)
*G03H 1/04* (2006.01)
*G02B 21/00* (2006.01)
*G02B 21/36* (2006.01)
*G02B 27/42* (2006.01)
*G02B 27/10* (2006.01)

(52) U.S. Cl.
CPC ......... *G02B 21/0092* (2013.01); *G02B 21/16* (2013.01); *G02B 21/365* (2013.01); *G02B 27/1006* (2013.01); *G02B 27/4233* (2013.01); *G02B 27/4261* (2013.01); *G03H 1/00* (2013.01); *G03H 1/0005* (2013.01); *G03H 1/0443* (2013.01); *G03H 2001/005* (2013.01); *G03H 2001/0452* (2013.01)

(58) Field of Classification Search
CPC ......... G03H 1/0443; G03H 2001/0452; G03H 1/0866; G03H 2001/005; G02B 21/365; G02B 21/16; G01B 9/02047
See application file for complete search history.

(56) References Cited

U.S. PATENT DOCUMENTS

2006/0132799 A1   6/2006  Dubois et al.
2008/0018966 A1*  1/2008  Dubois ............... G03H 1/0443
                                                            359/9

FOREIGN PATENT DOCUMENTS

JP        2015-1726 A     1/2015
WO     2016-163560 A1   10/2016

OTHER PUBLICATIONS

Translation of ISR, PCT/JP2017/036894, 2 pages, Dec. 5, 2017 (submitted in same file as priority document).

* cited by examiner (1) With diffraction grating　　　(2) Without diffraction grating

DIGITAL HOLOGRAPHIC MICROSCOPE

TECHNICAL FIELD

The present invention relates to a digital holographic microscope capable of simultaneously measuring fluorescence and phase in three dimensions.

BACKGROUND ART

Dynamic three-dimensional imaging of living cells is an important measurement technology in bio-application fields. For example, a fluorescence labeling technique is known which introduces a fluorescent molecule to specific DNA in cell nuclei using a fluorescence microscope and measures changes in cells undergoing mitosis. Various observations can be made by visualizing interactions of nuclei and proteins in cells stained with fluorescent molecules. A confocal laser scanning microscope is known as one that can measure a fluorescence three-dimensional image with high resolution and high contrast. However, with a confocal laser scanning microscope, it is necessary to scan the focal point for each point of the measurement object, and thus it takes time to obtain a fluorescence three-dimensional image, and accordingly there is an inherent limitation in the measurement of phenomena with rapid change of dynamic substance and simultaneous measurement of plurality of cells with different depth positions.

There is also a need for a technique that enables simultaneous observation of not only fluorescence images but also structures such as cell nuclei and cell walls. There are a phase contrast microscope and a differential interference microscope as means of structural observation. The phase difference image is effective for shape measurement of a transparent object.

If fluorescence images and phase images can be simultaneously observed, different information can be acquired simultaneously, and thus it becomes possible to provide more detailed information in the bioreaction.

Recently, an optical microscope capable of simultaneously observing a fluorescence image and a phase difference image is commercially available, but in addition to the need to replace filters, there is a restriction that one time measurement range is limited to one point or two dimensions.

On the other hand, a digital holographic microscope (Digital Holographic Microscope; DHM) is known as a tool that enables instantaneous three-dimensional measurement. In a digital holographic microscope, three-dimensional information is acquired as hologram information, and light wave information of an object with respect to a depth position is reconstructed by performing a back propagation calculation of the light wave in a computer. The digital holographic microscope is featured to have capability of three-dimensional observation of living cells without the need for special fluorescent staining (label-free), have an auto focusing function that can arbitrarily change the focal position by computer reconstruction and have capability of quantitative phase measurement. For this reason, even in a situation where cells move in three dimensions, it is possible to obtain a focused reconstructed image automatically by the reconstruction When digital holographic microscopy is applied to cell observation, hologram acquisition of fluorescence information is required, but in order to realize holography technology using fluorescence, there is a problem that fluorescent light is a coherent light very difficult to be interfered. In recent years, methods for making holograms from incoherent light have been proposed one after another, and research for fluorescence digital holographic microscopes (Fluorescence Digital Holographic Microscope; FDHM) has been activated around the world, but most of them include many spatial light modulators and optical elements. (for example, refer to Patent literature 1)

The hologram recording device disclosed in Patent Document 1 solves the problem that light with low coherence (for example, natural light or fluorescent light) cannot be observed, and by employing a spatial light modulator (a wave-front modulation element), the object light including the first component light and the second component light with polarizing directions thereof different to each other is made to have the wave front shape of the first component light and the wave front shape of the second component light different to each other, and generating a distribution that changes spatially and periodically, and a hologram is formed by making the first component light and the second component light interfere. As a result, it is possible to obtain a reconstructed image of the subject from a hologram recorded in one imaging using low-coherence light passing through a single light path. However, this method has a problem that it is limited to the observation of a low interference three-dimensional fluorescence image.

In addition, a fluorescence digital holographic microscope (FDHM) is suitable for targeting measurement, but has a problem of being powerless for substances that do not generate fluorescence. In addition, when performing fluorescence observation, there is also a problem that the measurement object is limited because harmful fluorescent molecules are used. Therefore, from the viewpoint of application expansion of digital holographic microscope (DHM), appearance of a multimodal digital holographic microscope capable of observing various types of information such as phase images, fluorescence images and polarization is desired.

In order to realize a multimodal digital holographic microscope, the inventors of the present invention have already prototyped a digital holographic microscope capable of two-dimensional fluorescence imaging and phase imaging, and has reconstructed a prototype from the hologram image as an experiment. (Refer to Non-patent literature 1) The manufactured microscope sequentially acquires a fluorescence image and a phase image, and does not measure a fluorescence image and a phase image simultaneously.

Hereinafter, in the present specification, the fluorescence image and the fluorescence three-dimensional image, and the phase image and the phase three-dimensional image are used in the same meaning, respectively.

PRIOR ART

Patent Literature

[Patent literature 1] JP 2015-1726 A

OUTLINE OF THE INVENTION

Problems to be Solved by the Invention

The prototype digital holographic microscope described above has both the functions of a fluorescence microscope and a digital holographic microscope for phase image detection, but switches the shutter inside to sequentially acquire the respective images, and it is not a microscope wherein the fluorescence digital holographic microscope and the phase image detection digital holographic microscope is combined, accordingly the fluorescence image and the phase image cannot be simultaneously measured in 3 dimensions.

In view of such circumstances, the present invention aims to provide a digital holographic microscope capable of measuring a fluorescence three-dimensional image and a phase three-dimensional image simultaneously and further capable of measuring a fluorescence three-dimensional image with a high S/N ratio (Signal to Noise Ratio) against all the deflection states including random deflection.

An object of the present invention is to provide a digital holographic microscope that a fluorescence three-dimensional image can be measured with a high S/N ratio to all the polarization states including random polarization.

Means to Solve the Objects

In order to achieve the above object, a digital holographic microscope of the present invention is furnished with the first holographic optical system for acquiring a phase three-dimensional image by interference light obtained by superimposing an object light passing through a sample to be observed and a reference light not passing through a sample by using a laser light, and the second holographic optical system for acquiring a fluorescence three-dimensional image by fluorescence signal light of a sample to be observed by using a fluorescence excitation light, a phase measurement by the first holographic optical system and a fluorescence measurement by the second holographic optical system are conducted simultaneously. And the second holographic optical system has a double-focus lens on which a diffraction grating is superimposed, and both the double-focus lens and the diffraction grating have polarization dependence. According to the digital holographic microscope of the present invention, fluorescence signal light is separated from the noise light by polarization dependence and said fluorescence signal light separated by the double-focus lens with the above diffraction grating superimposed is focused at the position deviated from the optical axis and the fluorescence three-dimensional image is obtained by an auto interference of the collected fluorescent signal light. Namely, the fluorescence signal light is self-interfered by the double-focus lens to obtain a fluorescence three-dimensional image, and the fluorescence signal light can be focused at the position deviated from the optical axis by the diffraction grating superimposed on a double-focus lens, and accordingly a fluorescence three-dimensional image with a higher S/N ratio can be obtained at the time of self-interference of the fluorescence signal light. Separating fluorescence signal light from noise light by polarization dependence means that the light of a modulation component of the fluorescence signal light is condensed at a position deviated from the optical axis by a diffraction grating superimposed on a double-focus lens, and is separated from the light of non-modulation component of the fluorescence signal light by a slit and so on. Then, the collected fluorescence signal light is caused to interfere with itself to obtain a fluorescence three-dimensional image, thereby suppressing the influence of the light of the non-modulated component and enabling a clear fluorescence three-dimensional image to be obtained, thereby enhancing the S/N ratio.

Namely, according to the above configuration, in the second holographic optical system for acquiring a fluorescence three-dimensional image, noise light of random polarization state is eliminated by forming a hologram with the light of a specific polarization state. The fluorescence three-dimensional image can be measured at a high S/N ratio for all polarization states including random polarization. Basically, the polarization state of the fluorescence signal light emitted from the sample to be observed is randomly polarized, but for all incident polarization (including random polarization) other than the polarization state insensitive to the bifocal lens and the diffraction grating, a high S/N ratio can be realized.

In the holographic optical system of the present invention, since the doublet lens and the diffraction grating have polarization dependence, it is possible to form a hologram in a specific polarization state (polarization direction), and non-modulated components other than the light forming a hologram can be eliminated by slits etc. and it is possible to raise the S/N ratio.

Here, the double-focus lens on which the diffraction grating is superimposed realizes the two functions of the double-focus lens and the diffraction grating simultaneously, and for example, having a large number of parallel grooves of a predetermined period on the surface of the lens having two focal lengths. It is a lens with a large number of parallel grooves in the spacing. Further, the double-focus lens on which the diffraction grating is superimposed may be one in which a diffraction grating is aligned with and overlapping the lens in the axial direction of the double-focus lens. Furthermore, the double-focus lens on which the diffraction grating is superimposed may be configured by a liquid crystal spatial light modulator (SLM; Spatial Light Modulator), which will be described later. In a phase modulation type liquid crystal spatial light modulation element, the state of liquid crystal molecules changes with voltage and a phase delay occurs, but there is a polarization state in which this phase delay does not occur. When incident light with that polarization state enters, there is a problem that no hologram is formed because the effect of the double-focus lens and the diffraction grating does not occur. However, since a polarization state in which such phase delay does not occur does not exist in the fluorescence signal light, a high SN ratio is substantially realized for the fluorescence signal light.

Further, as a fluorescence excitation light, both an incoherent light and a laser light having coherence can be used. Moreover, the noise light refers to surface reflection of an optical element, a reflected light by a cover glass, an exterior light, etc., and referring to lights other than the fluorescence signal light from an object.

In the digital holographic microscope of the present invention, the fluorescence signal light passing through a double-focus lens is divided into a light of modulated component and a light of non-modulated component. Among them, the light of the modulation component is diffracted by the diffraction grating superimposed on the double-focus lens, skews off the optical axis, and passes through a shutter having the opening at the position deviated from the optical axis. On the other hand, the noise light of the non-modulated component is not diffracted by the diffraction grating, travels straight on the optical axis, and is blocked by the shutter.

Since the fluorescence signal light passing through the double-focus lens has polarization characteristics, the excited fluorescence signal light irradiated on the sample is diffracted by the diffraction grating and propagate in the direction deviating from the normal of the diffraction grating by a diffraction angle ($\theta$). On the other hand, noise light is a random and non-polarized light, and goes straight on the optical axis without being diffracted by the diffraction grating. By providing the aperture of the shutter in a direction deviated from the perpendicular of the diffraction grating by the diffraction angle ($\theta$), the object light and the fluorescence signal light having polarization characteristics pass through the aperture, and the non-polarized noise light goes straight to be shut off by the shutter, and accordingly the SN ratio increases.

The diffraction grating in the digital holographic microscope of the present invention preferably has a different periodic structure for each focal length of the double-focus lens.

By having different periodic structures for each focal length of the double-focus lens, the light of the modulation component of the fluorescence signal light which has passed through the double-focus lens is made into two light waves having different diffraction angles, and by reconstructing the signal light from the interference intensity distribution of the interference fringes of the two light waves, the S/N ration can be improved.

For example, assuming that a double-focus lens has a focal length ($f_1$: 200 mm, $f_2$: 100 mm), the diffraction grating possesses a different periodic structures with respect to the focal length, so as to function as a lattice spacing of 2 μm cycle against a light having a focal length $f_1$ and a lattice spacing of 1 μm cycle against a light having a focal length $f_2$.

The bifocal lens is a bifocal Fresnel lens of a sub-wavelength periodic structure (Sub-wavelength Periodic structured Fresnel Lens; SPFL) and may be integrated with the diffraction grating. The subwavelength periodic structure is a structure for expressing polarization dependence. The subwavelength periodic structure, which is a diffraction grating structure having a period shorter than the wavelength of light, causes diffraction by the polarization state of the light wave. In addition, the Fresnel lens is a lens in which a normal lens is folded with the wavelength of light to reduce the thickness, and the cross section is saw-like and has a shape in which prisms are arranged. The bifocal Fresnel lens has a function of dividing one beam light into two and diffracting them to focus at different places.

Here, the diffraction grating superimposed on the double-focus lens has polarization dependence in the same direction as that of the double-focus Fresnel lens.

Both the diffraction grating and the double-focus lens have polarization dependence, so that only the signal light modulated by the double-focus lens is diffracted. If the diffraction grating does not have modulation dependency, noise light which is not modulated by the double-focus lens will also be diffracted, and noise will increase.

In addition, the double-focus lens on which the diffraction grating is superimposed may be configured by a liquid crystal spatial light modulation element. In the liquid crystal space optical device, the alignment of the liquid crystal molecules can produce different functions with respect to the polarization state of the incident light electric field. For example, when acting as an ordinary ray for linearly polarized light in a certain direction, it acts as an extraordinary ray for linearly polarized light perpendicular thereto. Therefore, it is possible to realize a polarization-dependent double-focus lens that acts only on a specific linear polarization direction (in this case, on an extraordinary ray).

The fluorescence signal light in the digital holographic microscope of the present invention is produced into two diffracted lights by a double lens realized by a liquid crystal spatial light modulator. The two diffracted lights have the same polarization to each other and cause self-interference. In this point, the function is different from that of the spatial light modulation element in the above-mentioned Patent Document 1 in which the first component light and the second component light having different polarization directions are interfered to form a hologram. (in the case of the present invention, for a fluorescence hologram, the fluorescence signal light and the object light for phase hologram correspond to the first component light and the second component light in Patent Document 1.)

In the digital holographic microscope of the present invention, a double-focus lens with polarization dependence is designed to act only on the second holographic optical system and not on the first holographic optical system.

By designing a double-focus lens so that the lens has no sensitivity to the polarization of the object light of the first holographic optical system that acquires a phase three-dimensional image and does not cause a lens effect, and the lens has strong sensitivity to the polarized light of fluorescence light of the second holographic optical system for acquiring the second holographic optical system, only the polarized light of the fluorescence light of the second holographic optical system generates self-interference by the double-focus lens.

In the second holographic optical system of the present invention, at least 1 micro mirror is set at an on state by using a display device wherein many micro-mirrors being arrayed in a plane, the fluorescence excitation light or the fluoresce signal light transmit partially, and a fluorescence three-dimensional image is acquired by using a single detector as the imaging means.

For example, a digital mirror device (DMD) is suitably used as the display device wherein many micro-mirrors being arrayed in a plane.

A system capable of acquiring a hologram for a weak fluorescent signal by inserting a display device such as the DMD capable of freely setting a modulation pattern in the optical path between the light source of fluorescent excitation light or fluorescent signal light and the imaging means can be built.

The imaging means modulates the spatial pattern of the fluorescence signal with the DMD using a single detector rather than a pixel matrix image sensor, and acquires light energy of the modulated fluorescence signal. A hologram pattern is reconstructed on a computer using a method of compressed sensing (a method to reconstruct the signal to become an observation object from as few as possible observation by acquiring data efficiently by conducting simultaneous observation and compression) from a combination of a modulation pattern by DMD and its light energy. Based on the above, when applied to a living tissue, the fluorescence signal can be obtained without damaging the living tissue by restraining the light energy to be irradiated on the living tissue.

In the second holographic optical system in the digital holographic microscope of the present invention, the wavelength of the fluorescence excitation light may be switchable. The wavelength of the fluorescence excitation light is switched according to the fluorescence characteristics of the sample to be observed. Thus, by switching and using the wavelength of the fluorescence excitation light in accordance with the type of the fluorescent staining reagent, it is possible to select target cells and measure changes in cell state such as division and shape change.

That is, using the digital holographic microscope of the present invention, a cell observation method for observing cell behavior can be realized from the fluorescence three-dimensional image acquired using the wavelength of a certain fluorescence excitation light, the fluorescence three-dimensional image acquired by using the wavelength of other fluorescence excitation light and the phase three-dimensional image simultaneously acquired.

In the digital holographic microscope of the present invention, it is preferable that the first holographic optical system is transmission type and the second holographic optical system is reflective (incident) type. Further, both the first and the second holographic optical systems may be inverted up-side down depending on the installation state of the sample.

In the second holographic optical system that acquires a fluorescence three-dimensional image of the sample to be observed by the fluorescence excitation light, because the fluorescence signal is weak, it becomes very difficult to cut only the strong fluorescence excitation light in the transmission type, when a transmission mode is chosen.

In a case wherein the second holographic optical system is made to be transmission type, not a reflective (incident) type, it becomes necessary to cut the fluorescence excitation light sufficiently and employ a dichroic mirror that transmits only the fluorescence signal and a band pass filter that transmits specific wavelength of the fluorescence wavelength and the laser wavelength.

In the digital holographic microscope of the present invention, the imaging means of the first holographic optical system and the imaging means of the second holographic optical system are shared, and the imaging means comprises a fluorescence three-dimensional image and the imaging means acquires the fluorescence three dimensional image and the phase three dimensional image simultaneously as a hologram. And the fluorescence three dimensional image of the concentric hologram and the phase three dimensional image of the equal inclination angle hologram are separated in the spatial frequency plane and reconstruct the object light and the fluorescence signal light from the respective interference intensity distribution.

In the fluorescence three-dimensional image, the interference pattern becomes concentric because the polarized light of the fluorescence of the second holographic optical system causes self-interference. On the other hand, the phase three-dimensional image can be made into an interference pattern with a carrier frequency by using equal-angle interference. The concentric interference pattern and the equal-angle interference pattern can be separated in the spatial frequency plane, and the fluorescence three-dimensional image and the phase three-dimensional image can be separated in the spatial frequency plane from the image captured by the imaging means. By conducting the Fourier transformation on two hologram patterns, it is possible to extract the component of the equal-angle interference pattern by the band pass filter on the spatial frequency plane. By acquiring the reference light intensity distribution used for the equal-angle interference pattern in advance, it is possible to extract only the concentric interference pattern.

In the digital holographic microscope of the present invention, the imaging means of the first holographic optical system and the imaging means of the second holographic optical system are shared, and the imaging means simultaneously acquire a fluorescence three-dimensional image and a phase three-dimensional image as a hologram. And a fluorescence three-dimensional image of the equal angle hologram by off axis interference and a phase three-dimensional image of the equal angle hologram is separated at the spatial frequency plane and object light an fluorescence signal light may be reconstructed from each interference intensity distribution.

In the digital holographic microscope of the present invention, when observing cells, it is preferable to simultaneously acquire spatiotemporal information of cell nuclei by fluorescence three-dimensional images and spatiotemporal structures of cell nuclei and cell walls by phase three-dimensional images.

Multidimensional information obtained from a plurality of physical quantities has not been obtained by the measurement in the conventional bio-imaging field, and the digital holographic microscope of the present invention enables observation that has not been possible conventionally. The digital holographic microscope of the present invention enables simultaneous and high-speed imaging of a fluorescence three-dimensional image and a phase three-dimensional image as a powerful measurement rule in the field of bio-imaging.

Namely, it is possible to realize a cell observation method of simultaneously acquiring spatiotemporal information of cell nucleus by fluorescence three-dimensional image and spatiotemporal structure of cell nucleus or cell wall by phase three-dimensional image by using the digital holographic microscope of the present invention.

The digital holographic microscope of the present invention is a digital holographic microscope furnished with a holographic optical system for acquiring a fluorescence three-dimensional image of a sample to be observed by fluorescence signal light using fluorescence excitation light, and the holographic optical system comprises a double-focus lens superimposed with a diffraction grating, and the double-focus lens and the grating both possess polarization dependence and separate the fluorescence signal light from the noise light by polarization dependence, and by a double-focus lens being superimposed with said diffraction grating focus the separated said fluorescence signal light at the position deviated from said optical axis and acquire a florescence three-dimensional image by letting self-interfere with the focused fluorescence signal. Namely, the fluorescence signal light can be made to interfere with the double-focus lens to obtain a fluorescence three-dimensional image, and the fluorescence signal light can be condensed at a position deviated from the optical axis by the diffraction grating having polarization dependence. At the time of self-interference of fluorescence signal light, it is possible to increase the S/N ratio to acquire a fluorescence three-dimensional image.

Effects of the Invention

According to the digital holographic microscope of the present invention, a fluorescence digital holographic microscope and a phase image detection digital holographic microscope are combined, and a fluorescence three-dimensional image and a phase three-dimensional image can be simultaneously measured, and by forming a hologram with a light under a specific polarization state, there is an effect that a fluorescence three-dimensional image can be measured with a high S/N ratio to all the polarization states including random polarization (excluding a polarization states insensitive to a bifocal lens and a diffraction grating).

Further, according to the digital holographic microscope of the present invention, in the measurement by a single shot, there is an effect that fluorescence three-dimensional images with high S/N ratio can be measured with respect to all the polarization states including a random polarization state (but, excluding insensitive polarization states against double-focus lenses and diffraction gratings).

BEST MODE FOR CARRYING OUT THE INVENTION

Embodiments of the present invention will be described in detail below with reference to the drawings. The present invention is not limited to the following embodiment and examples of shown in the figure, and the present invention can be variously changed in design.

Embodiment 1

Figure 1:
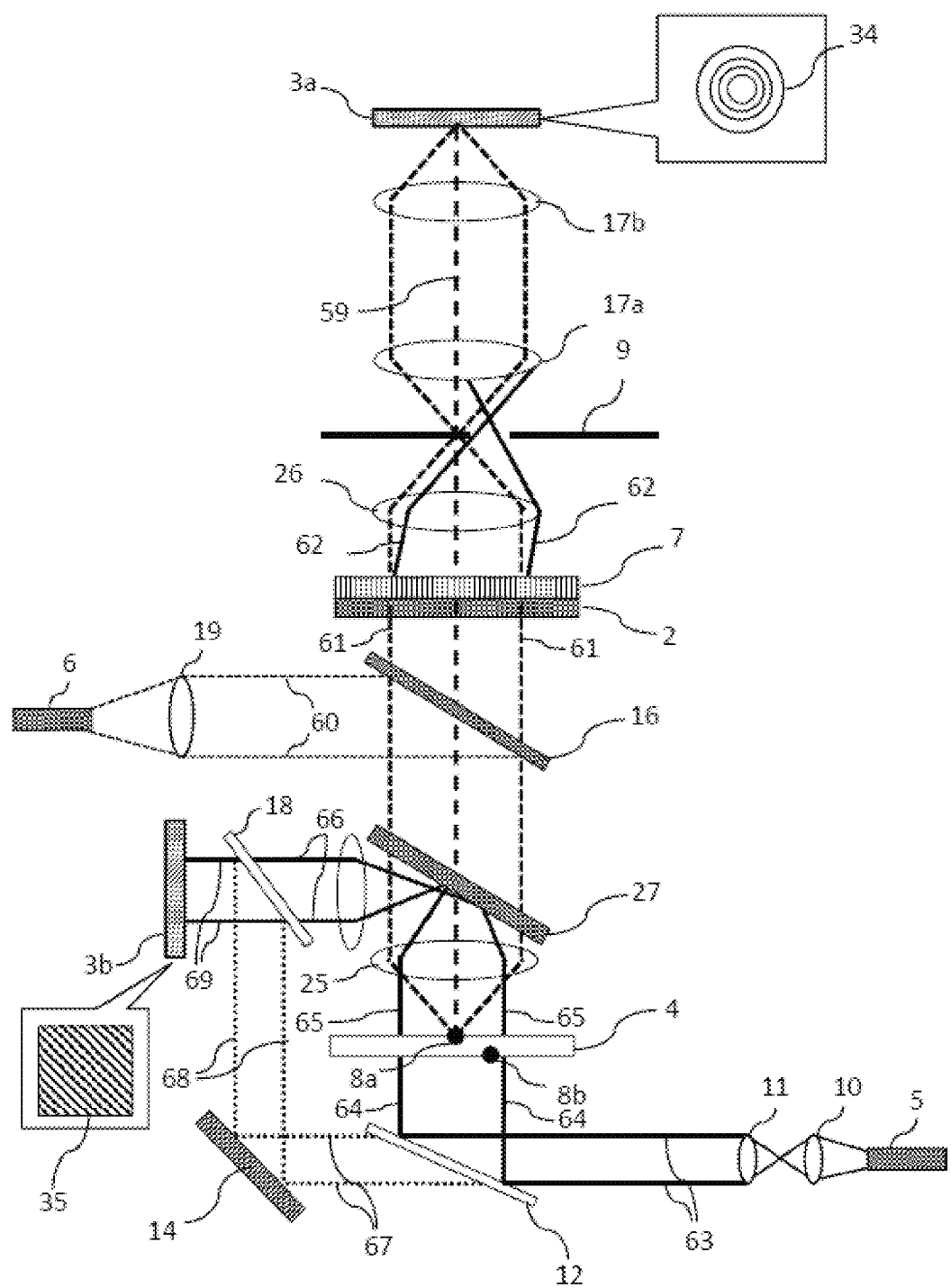
FIG. 1 shows a configuration of an optical system of Embodiment 1 of a digital holographic microscope.

FIG. 1 shows the configuration of the optical system of an embodiment of the digital holographic microscope. The digital holographic microscope shown in FIG. 1, in the 2 optical systems consisting of an optical system of transmission type digital holographic microscope (the first holographic optical system for acquiring a phase three-dimensional image) and an optical system of reflection type fluorescence microscope (the second holographic optical system for acquiring a fluorescence three-dimensional image), as a common optical path; the object light and the fluorescence signal light are coaxially superimposed from the sample stage to the transmission point of the object lens, the fluorescence signal light and the object light for phase measurement are separated by the difference of the wavelength and the difference of the polarization direction after transmitting the object lens, and 2 holograms; a phase three-dimensional image and a fluorescence three-dimensional image are simultaneously acquired by imaging means respectively different from each other. Namely, by synchronizing the image sensors 3a and 3b of the respective optical systems used as imaging means, two holograms of a fluorescence three-dimensional image and a phase three-dimensional image are simultaneously obtained.

Below, the first holographic optical system and the second holographic optical system are explained in detail.

Figure 2:
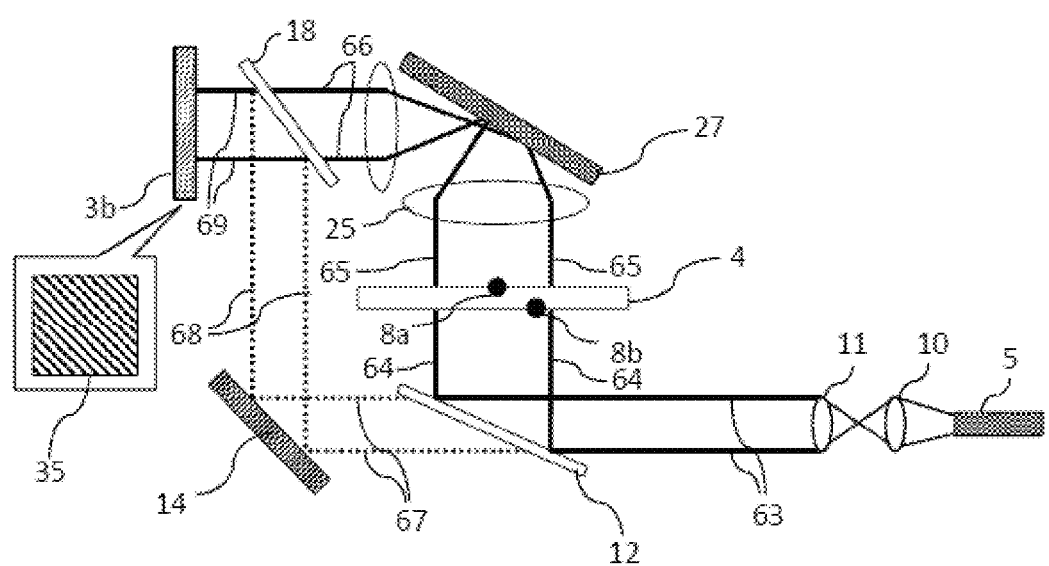
FIG. 2 shows a configuration of an optical system of Embodiment 1 of a first holographic optical system for acquiring a phase three-dimensional image.

First, an optical system (a first holographic optical system for acquiring a phase three-dimensional image) of the transmission type digital holographic microscope shown in FIG. 2 is described.

The measurement object of the observation target sample on the sample stage 4 is illuminated using the He—Ne laser light source 5 of the wavelength 633 (nm). The He—Ne laser beam 63 is divided by the beam splitter 12 into a path of object lights (64, 65, 66) that transmit the measurement object and a path of reference light (67, 68) without any. This optical system constitutes a Mach-Zehnder interferometer. The object light 65 transmitted through the measurement object travels to the dichroic mirror 27 after entering the objective lens 25. Using the fact that the wavelength 633 (nm) of the He—Ne laser beam that transmits the measurement object is longer than the wavelength of the fluorescence excitation light in the wavelength band of 355 nm to 550 nm or the fluorescence signal light of longer wavelength, it is possible to reflect only the object light 65 transmitting through the measurement object and transmit the other fluorescence signal light 61 and the like. Object light (65, 66) which transmits the measurement object interfere with the reference light (67, 68) by the beam splitter 18. At this time, since an off-axis hologram, namely, a hologram of an equal-inclination-angle interference pattern is generated by slightly angling between the object light and the reference light, which is acquired by the image sensor 3b. From the hologram 35 of the equal-inclination-angle interference pattern acquired by the image sensor 3b, the amplitude distribution and the phase distribution of the object light are extracted using the Fourier transformation method. In the off-axis method, by propagating back to the original object position, the wave front of the object light of the sample to be observed is reproduced, and the object light can be reconstructed.

Figure 3:
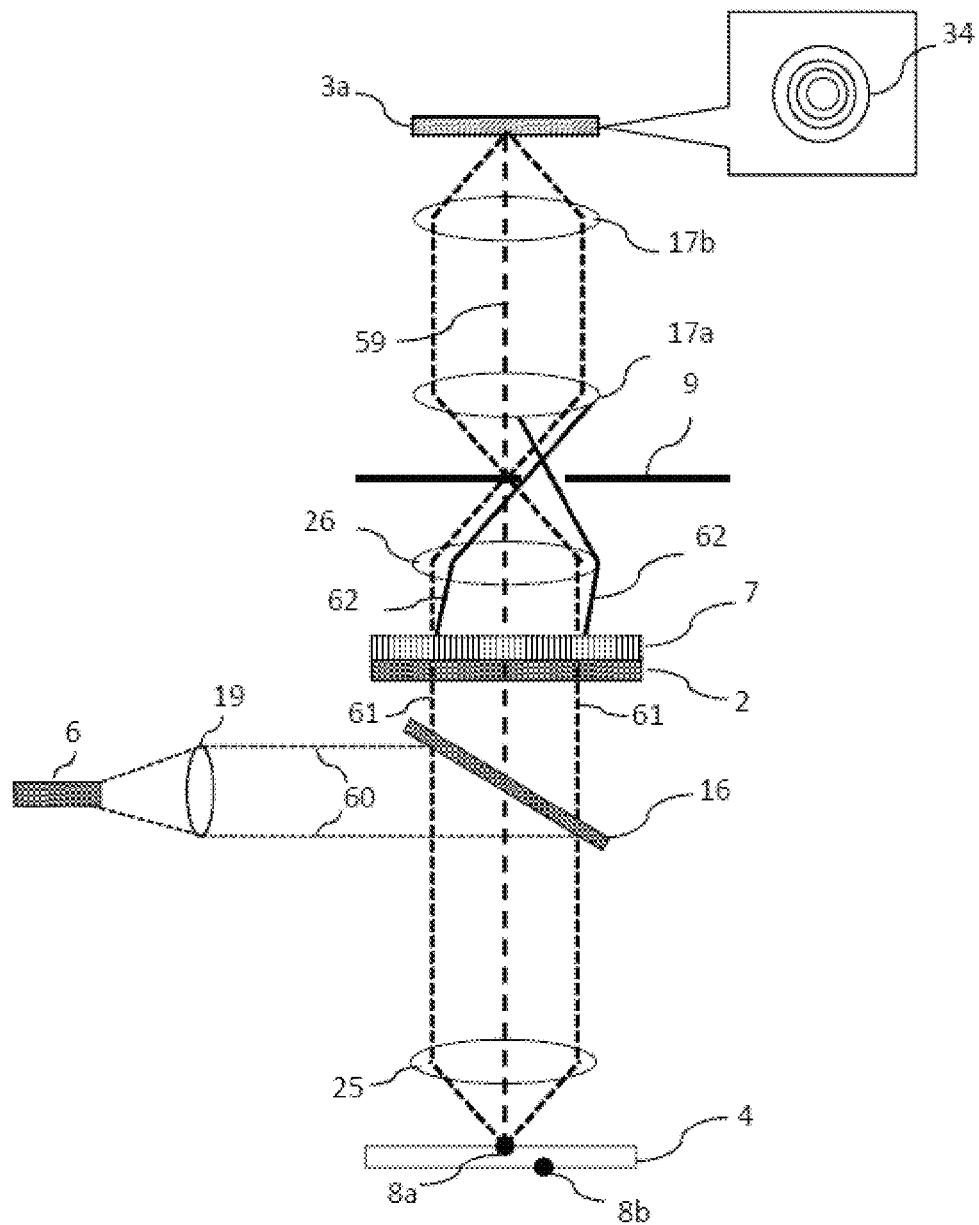
FIG. 3 shows a configuration of an optical system of Embodiment 1 of a second holographic optical system for acquiring a phase three-dimensional image.

Next, the optical system (the second holographic optical system for acquiring a fluorescent three-dimensional image) of the reflection type fluorescence microscope shown in FIG. 3 will be described.

The measurement object of the observation target sample on the sample stage 4 is illuminated using the He—Ne laser light source 5 of wavelength 633 (nm), and at the same time, the fluorescence excitation light source 6 of wavelength 355 nm to 550 nm is used to excite the fluorescence molecules (8a, 8b) which is the sample to be observed on the sample stage 4. The excited fluorescent molecules 8a emit fluorescence signal light of a wavelength longer than that of the fluorescence excitation light in the wavelength range of 355 nm to 550 nm, and enter the objective lens 25 together with the fluorescence excitation light reflected on the glass substrate surface of the sample stage 4. The fluorescence excitation light 60 is sufficiently attenuated and the fluorescence signal light 61 is emphasized by using a dichroic mirror 16 that reflects light of a specific wavelength and transmits light of other wavelengths.

Figure 4:
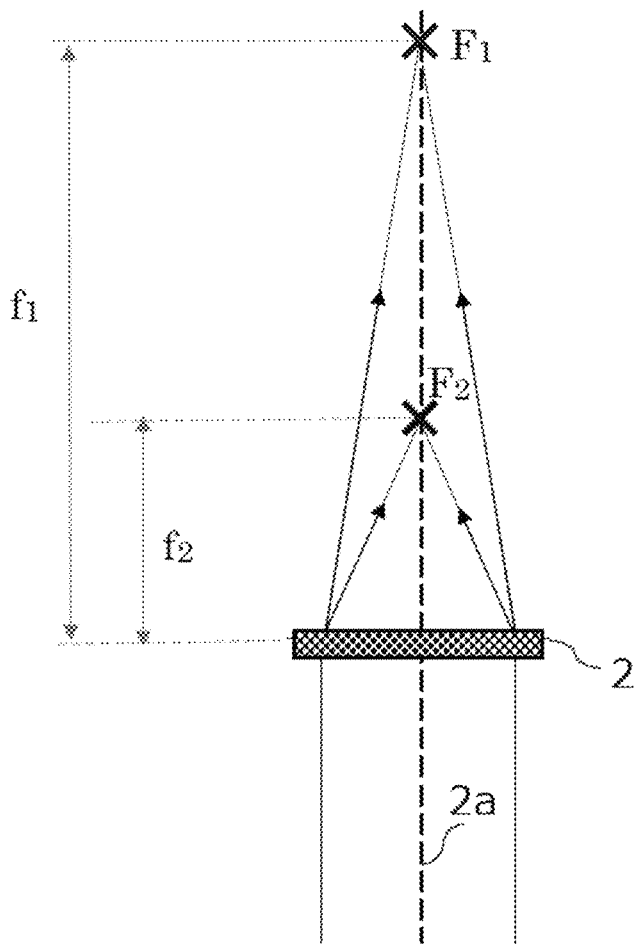
FIG. 4 shows an explanation of a double-focus lens.
Figure 5:
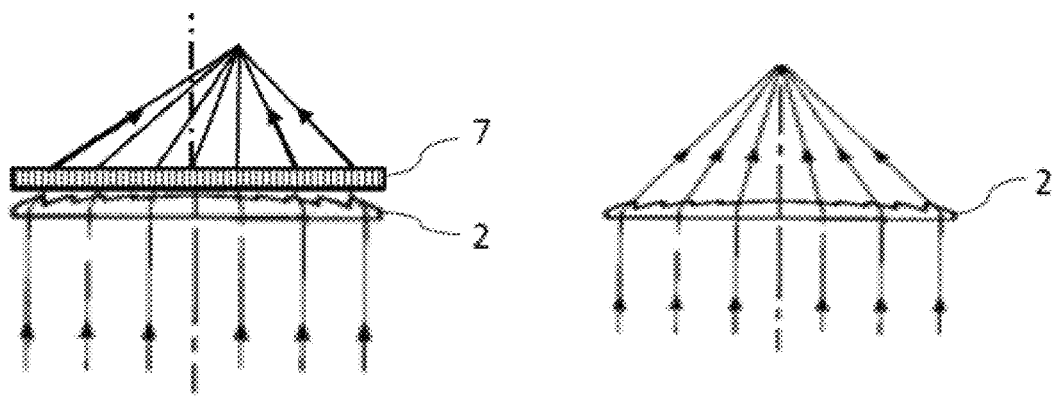
FIG. 5 shows an explanation of a double-focus lens on which a diffraction grating is superimposed.

Then, using the bifocal lens 2 on which the diffraction grating 7 is superimposed, a fluorescence three-dimensional image is acquired by self-interference of the fluorescence signal light. Since the fluorescent signal light 61 self-interferes with the bifocal lens 2, the fluorescent three-dimensional image becomes a hologram 34 of a concentric pattern. The double-focus lens 2 is a double-focus Fresnel lens having two focal lengths ($f_1$, $f_2$) as shown in FIG. 4 and FIG. 5. One fluorescence signal light generates two diffracted waves by a double-focus Fresnel lens, and the two diffracted waves are focused at different places.

By referring to FIG. 5, the difference between the double-focus lens on which the diffraction grating is superimposed and the double-focus lens on which the diffraction grating is not superimposed will be described. In the case of a double-focus lens in which a diffraction grating is not superimposed, light incident in parallel with the optical axis is condensed on the optical axis as shown in FIG. 5 (2). In a double-focus lens having polarization dependence, light of a specific polarization orientation is passed and condensed on the optical axis, and the light of different polarization orientation is blocked. On the other hand, in a double-focus lens in which a diffraction grating is superimposed, as shown in FIG. 5A, the light incident parallel to the optical axis is not condensed on the optical axis, but the condensing spot becomes displaced from the optical axis by the diffraction grating 7. This is because the light is diffracted by each slit of the diffraction grating 7 to produce a wave that is laterally bent and travels. As a result of interference of light waves diffracted by different slits, the incident light propagates strongly only in a specific direction. When there is a difference in optical path length between integral multiples of the wavelength of light between light waves diffracted by adjacent slits, a strong diffracted light is generated. In this case, in the double-focus lens having polarization dependence, the light of a specific polarization orientation is transmitted, so that the polarization orientation passing through the slit of the diffraction grating 7 is also matched to the polarization orientation of the double-focus lens. The light is diffracted by the diffraction grating 7 so that the focusing point is shifted from the optical axis.

Figure 6:
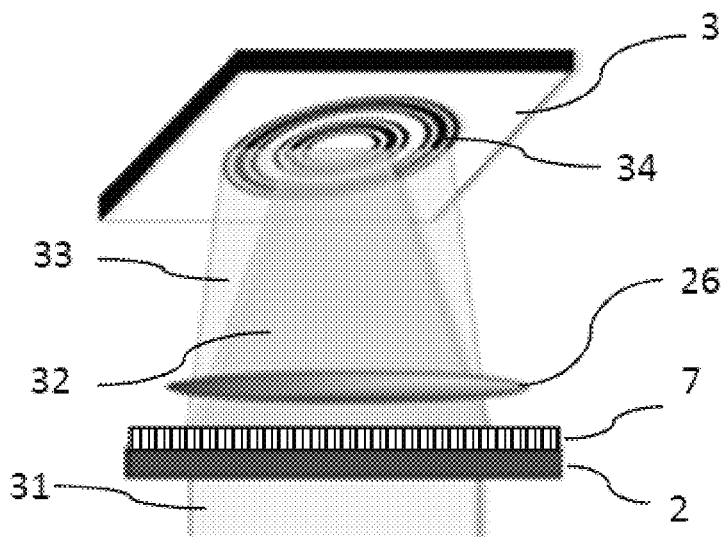
FIG. 6 shows an explanation of a hologram produced by self-interference with a double-focus lens.

A hologram produced by self-interference with a double-focus lens will be described by referring to FIG. 6.

As described above, in the optical system of FIG. 1, when the fluorescence excitation light source 6 is used to excite the fluorescent molecules (8a, 8b) of the sample to be observed on the sample stage 4, the excited fluorescence molecules emit fluorescence signal light having a longer wavelength than the fluorescence excitation light and emits the fluorescence signal light, and enters the objective lens 25 together with the fluorescence excitation light reflected on the surface of the glass substrate of the sample stage 4.

The fluorescence signal light having passed through the lens 25 is enhanced by the dichroic mirror 16 and is incident on the dual focal lens 2 on which the diffraction grating 7 is superimposed. As shown in FIG. 6, two light waves (32, 33) are generated from the fluorescence signal light 31 by the double-focus lens 2. Since these light waves (32, 33) are focused at different places, the fluorescence signal light 31 causes self-interference. The interference fringes are concentric because of self-interference. Namely, a hologram 34 having a concentric pattern is obtained as a fluorescence three-dimensional image captured by the image sensor 3.

A diffraction grating 7 is superimposed on the double-focus lens 2. For this reason, the fluorescence signal light 31 transmitted through the double-focus lens 2 is diffracted by the diffraction grating 7 and is bent and advance in the lateral direction as the diffracted light, so that the focal point deviates from the optical axis. The lens 26 functions to condense the light wave emitted from the double-focus lens 2 at a short distance.

An optical system using a double-focus lens on which a diffraction grating is superimposed will be described again referring to FIG. 3. 2 fluorescence molecules (8a, 8b) inside the sample to be observed on the sample stage 4 are excited to generate fluorescence signal light. When the diffraction grating 7 does not exist, the fluorescence signal light generated from the fluorescence molecule 8a follows the optical path drawn by the dotted line in the figure by the double-focus lens 2, the lenses (25, 26) and the tube lens (17a, 17b), and focus on the optical axis 60. In the image sensor 3, since the fluorescence signal light 61 self-interferes, the hologram 34 of the concentric pattern is imaged as a fluorescence three-dimensional image. Although not shown, fluorescence signal light generated from the fluorescence molecule 8b also follows the same optical path. The two fluorescence molecules (8a, 8b) have different spatial positions (the surface direction of the sample stage 4 and the thickness direction are different).

Here, when the diffraction grating 7 is provided, namely, when the diffraction grating 7 is superimposed on the double-focus lens, the fluorescence signal light 61 generated from the fluorescent molecule 8 a passes through the double-focus lens 2 and then, the light is diffracted when it transmits through the diffraction grating 7 and the diffracted wave 62 advances bent in the lateral direction and the condensing spot deviates from the optical axis.

The diffracted wave 62 passes through the opening of the shutter 9 and follows the same optical path as in the case without the diffraction grating 7 by the tube lenses (17a, 17b), and condenses at a position deviated from the optical axis 60. In the image sensor 3, the hologram. 34 of the concentric pattern is imaged as a fluorescence three-dimensional image. Here, since the opening of the shutter 9 does not exist at the position of the optical axis 60, the light collected on the optical axis is blocked. As the light to be blocked, the light having a polarization orientation different from the polarization orientation of the diffraction grating 7, for example, the light of a polarization component not affected by the double-focus lens 2, the surface reflected light at an optical element, the random polarization noise light and so on are listed.

Figure 7:
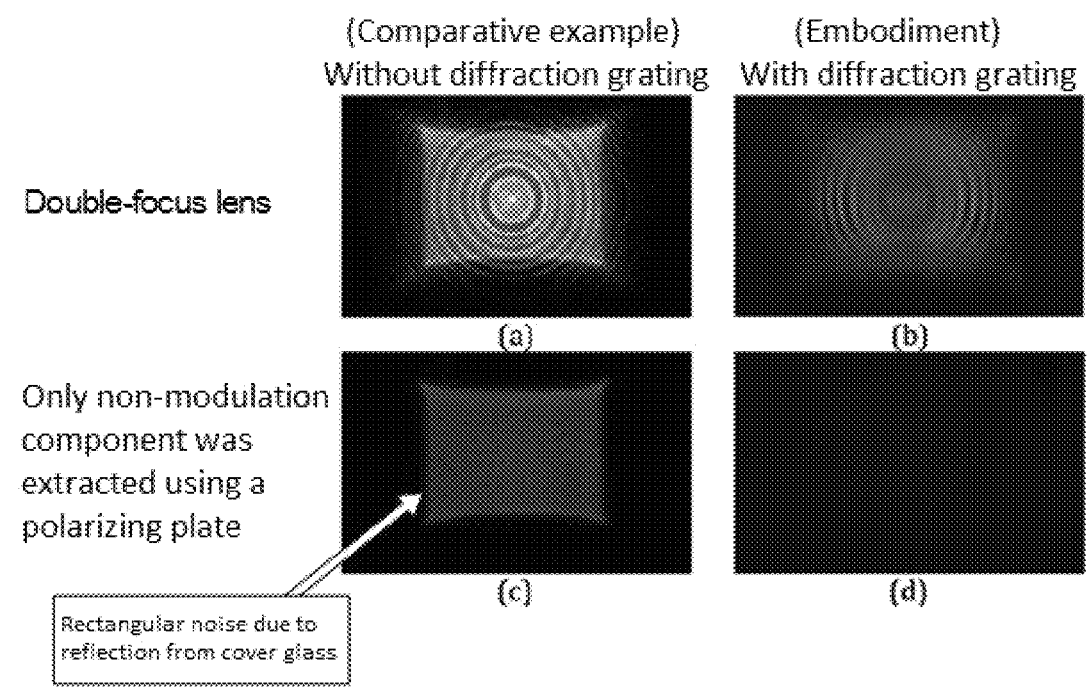
FIG. 7 shows an explanation about a difference of a hologram by the presence or absence of a diffraction grating.
Figure 19:
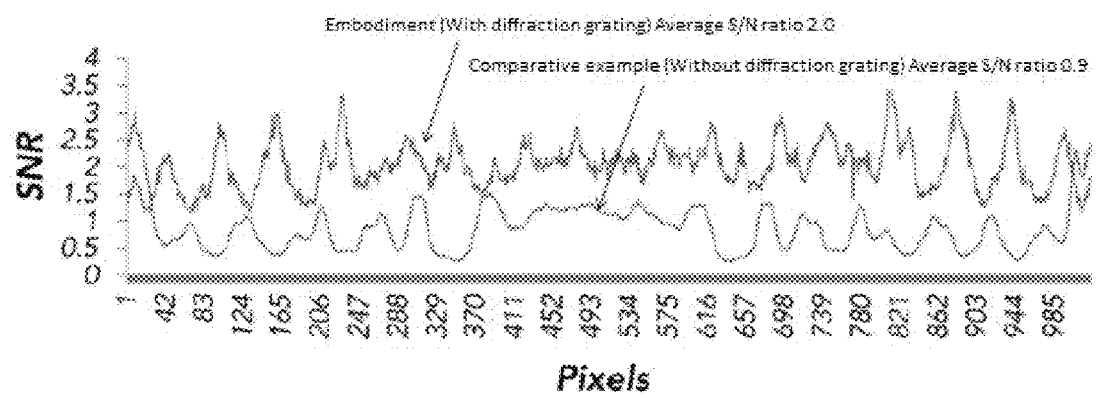
FIG. 19 is a comparison graph of the S/N ratio on a hologram surface. (Embodiment 1)

Next, using the light emitting diode (LED) simulating the fluorescence molecule, the experimental result of using the light emitted from the LED as the fluorescence signal light is described by referring to FIG. 7 and FIG. 19. In the experiment, a 10 μm diameter pinhole illuminated by an LED (wavelength 580 nm, half width 50 nm) was used as the object. The experiment was carried out with one object (in the case of one focused spot of LED). As a diffraction grating, a liquid crystal spatial light modulator (SLM) (20 μm pitch, 800×600 pixels) for phase modulation was used. In the experiment, the holograms were respectively confirmed in the case where there is no diffraction grating superimposed on the double-focus lens (comparative example) and in the case where a diffraction grating is present (example). Moreover, the case wherein only the non-modulation component was extracted using a polarizing plate was confirmed.

The hologram of the experimental result is shown in FIG. 7. As shown in FIGS. 7A and 7B, in the embodiment (diffraction grating present), it was confirmed that the rectangular pattern considered to be a reflected light from the cover glass is weaker than that in the comparative example (diffraction grating present). In addition, as shown in FIGS. 7C and 7D, when only the non-modulated component is extracted, rectangular noise due to reflection from the cover glass is remarkable in the comparative example (without the diffraction grating). In the example (diffraction grating present), rectangular noise could not be confirmed. From these results, it can be confirmed that the S/N ratio of the example (with diffraction grating) is improved as compared with the comparative example (without diffraction grating).

FIG. 19 is a comparison graph of the S/N ratio on the hologram surface. In the graph of FIG. 19, the horizontal axis is the pixel in the horizontal direction of the captured image, and the vertical axis is the S/N ratio. As shown in FIG. 19, while the average S/N ratio is 0.9 in the comparative example (without the diffraction grating), the average S/N ratio is 2.0 in the embodiment (with the diffraction grating), and the S/N ratio is 2.0, confirming that the S/N ratio has become higher than 2 times.

Figures 9, 10:
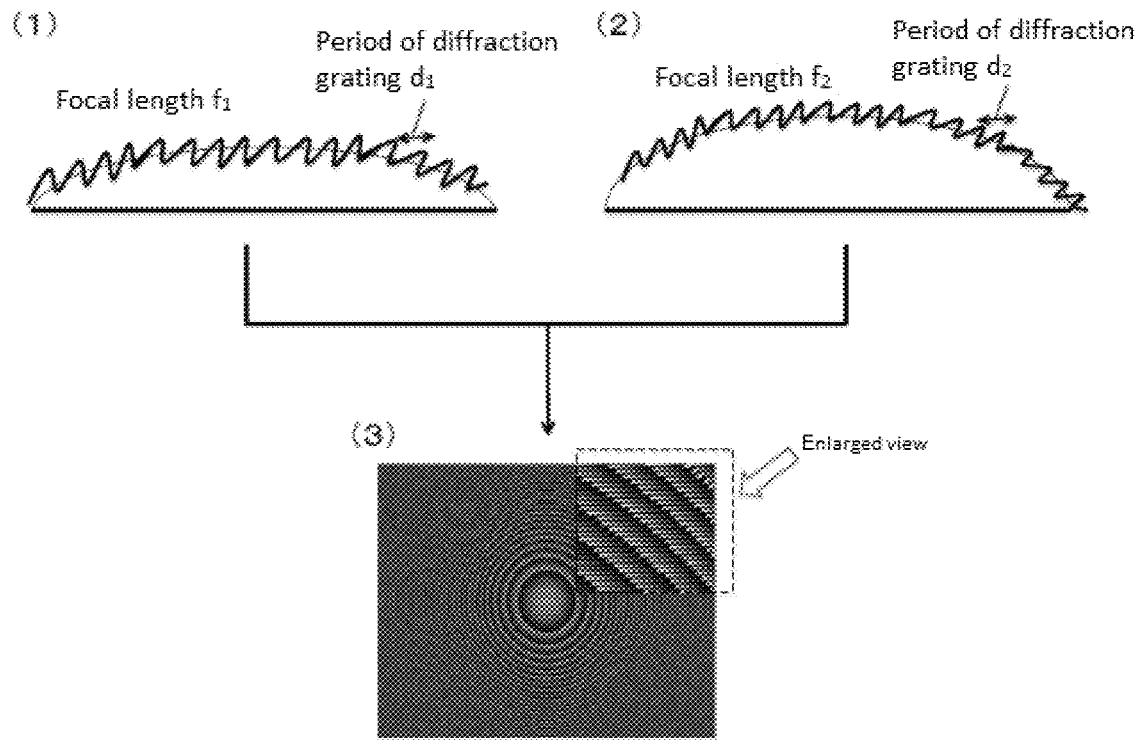
FIG. 9 shows an explanation of a double-focus lens on which diffraction gratings of different periodic structures are superimposed.
FIG. 10 shows an explanation about a difference of reconstructed images by the presence or absence of a diffraction grating.

Next, by referring to FIG. 10, the difference in the reconstructed image in the second holographic optical system of this embodiment on the presence or absence of the diffraction grating having the same periodic structure is described. The image shown in FIG. 10 is a reconstructed image of the fluorescence signal light of the light emitting diodes (LEDs 1 and 2) simulating two fluorescence molecules. The image on the left is a reconstruction of a fluorescence three-dimensional image captured using a double-focus lens with a diffraction grating superimposed (with a diffraction grating), and the image on the right is a reconstruction of a fluorescence three-dimensional image captured using a double-focus lens without a superimposed diffraction grating (without a diffraction grating). Also, the upper two images use incoherent signal light of the light emitting diode 1 (LED 1), and the lower two images use incoherent signal light of the light emitting diode 2 (LED 2). Although the LEDs 1 and 2 have the same wavelength, they are present at spatially different positions as the fluorescence molecules (8a and 8b) in FIG. 1.

The incoherent signal light emitted from the LED 1 and the incoherent signal light emitted from the LED 2 both transmit and diffract through the double-focus lens on which the diffraction grating is superimposed. The focal lengths ($f_1$, $f_2$) of the double-focus lens are $f_1$=2000 mm and $f_2$=1500 mm, and the grating interval of the diffraction grating is 0.04 mm.

Figure 11:
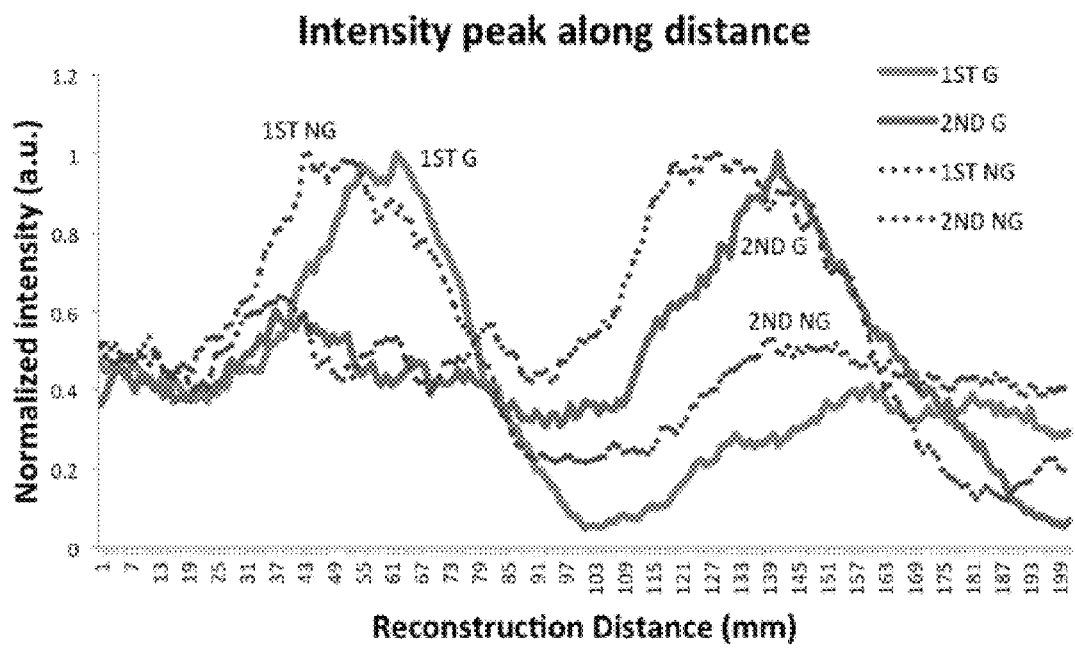
FIG. 11 shows a graph of clarity (degree of light and dark) of a reconstructed image.

FIG. 10 and FIG. 11 show experimental results of the measurement of a three-dimensional image using incoherent signal light using a diffraction grating having the same periodic structure. The position of the diffraction grating is determined by the periodic structure of the diffraction grating and the wavelength of the modulated light. In addition, although it is desirable to make the slit width as wide as possible, since it is necessary to remove unmodulated components, the width is adjusted to an appropriate width by the spatial spread of the fluorescence signal.

Note that, in FIG. 11, the diffraction grating (1ST G) and the diffraction grating (2ND G) have the same periodic structure, and the position of the diffraction grating is the same, but the locations of LED 1 and LED 2 are supposed to be at spatially different positions and therefore they are split from each other.

From the image of FIG. 11, in the upper two reconstructed images, the shape of the LED 1 (located on the left side) is clearer in the presence of the diffraction grating than in the absence of the diffraction grating. Further, in the lower two reconstruction images, the shape of the LED 2 (located on the right) is clearer with the diffraction grating than without the diffraction grating.

The clarity (the degree of light and dark) of the reconstructed image can be described by the graph of FIG. 11. The graph in FIG. 11 shows the intensity distribution according to the longitudinal distance from the peak position of the light intensity in the reconstructed image of four cases, in the case where there is a diffraction grating (1ST G, 2ND G) and in the case where there is no diffraction grating (1ST NG, 2ND NG). When a diffraction grating (1ST G) is used, an intensity peak appears on the left side of the graph. On the other hand, when a diffraction grating (2ND G) is used, an intensity peak appears on the right side of the graph. In the graph, each peak value is normalized as 1. In the intensity distribution where the intensity peak appears on the left side and the intensity distribution where the intensity peak appears on the right side, the difference between the maximum intensity and the minimum intensity is larger when there is a diffraction grating (1ST G, 2ND G), and the shape of the intensity becoming shaper and it can be seen that the reconstructed image is clear.

Figure 20:
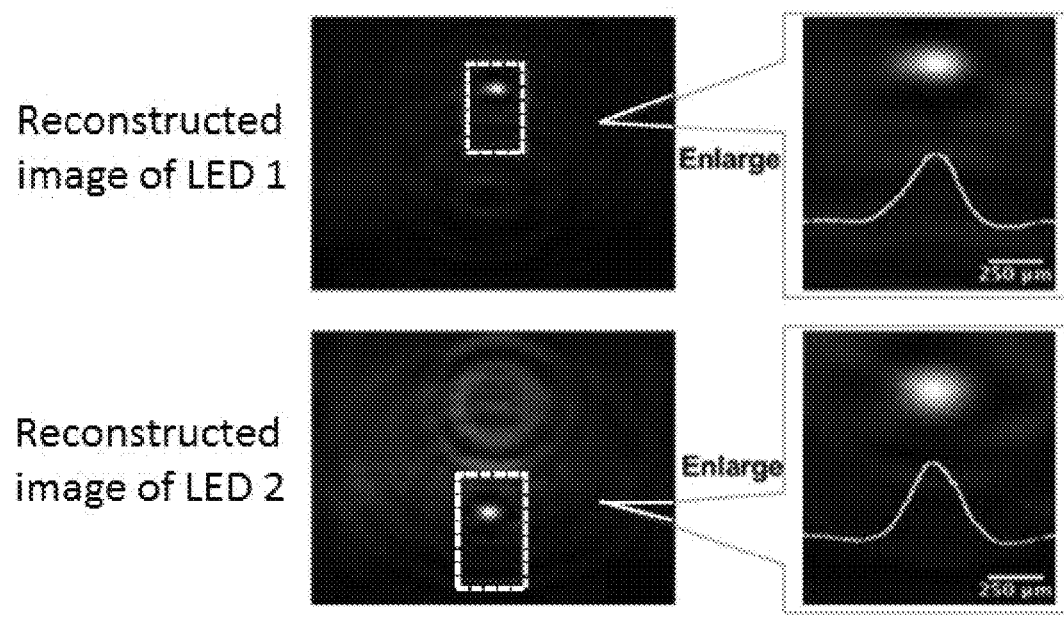
FIG. 20 shows a reconstructed image of two LED light sources. (Embodiment 1)
Figure 21:
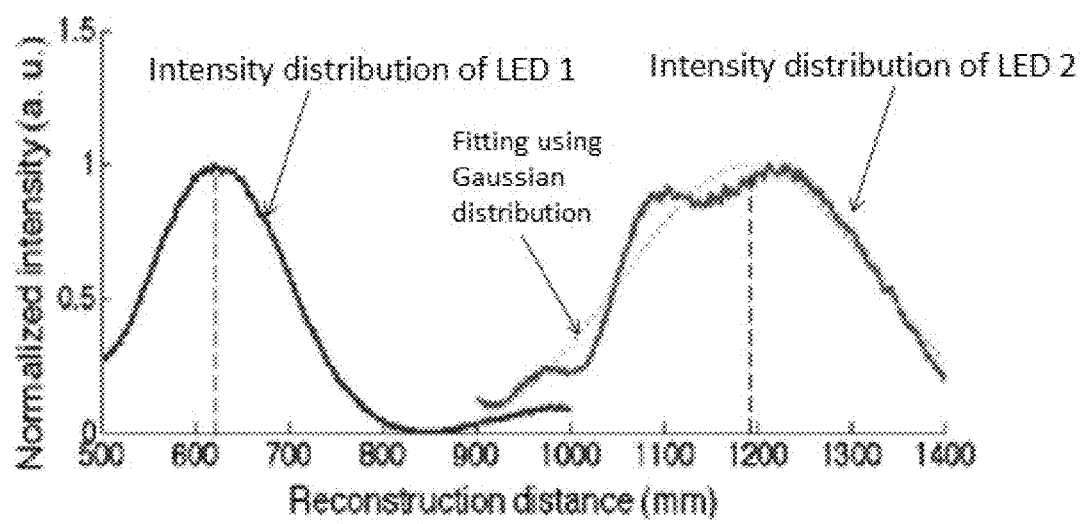
FIG. 21 shows an intensity distribution graph at a reconstructed image distance of two reconstructed images. (Embodiment 1)

FIG. 20 shows a reconstructed image from a hologram in which two LEDs, 1 and 2 are simultaneously recorded and its magnified images and FIG. 21 shows an intensity distribution graph at the reconstructed image distance of the two reconstructed images. FIG. 20 shows the reconstructed images of the two LEDs 1 and 2 at the reconstructed image distance at which the respective intensity peaks appear from the graph of FIG. 21. According to the graph in FIG. 21, the intensity distribution of LED 1 peaks at a reconstruction image distance of about 620 mm, and the intensity distribution of LED 2 peaks at a reconstruction image distance of about 1190 mm. Further, in the intensity distribution graph of LED2, since it seems that there are two peaks, fitting is performed with a Gaussian distribution to determine the peaks. It can be confirmed that the respective reconstructed images clearly appear in the reconstructed images of FIG. 20. In the magnified image, the scale is 250 μm. It has been theoretically derived that this magnification is determined by the arrangement of the optical system, and it is confirmed that it is consistent with the experimental results.

Embodiment 2

Figure 8:
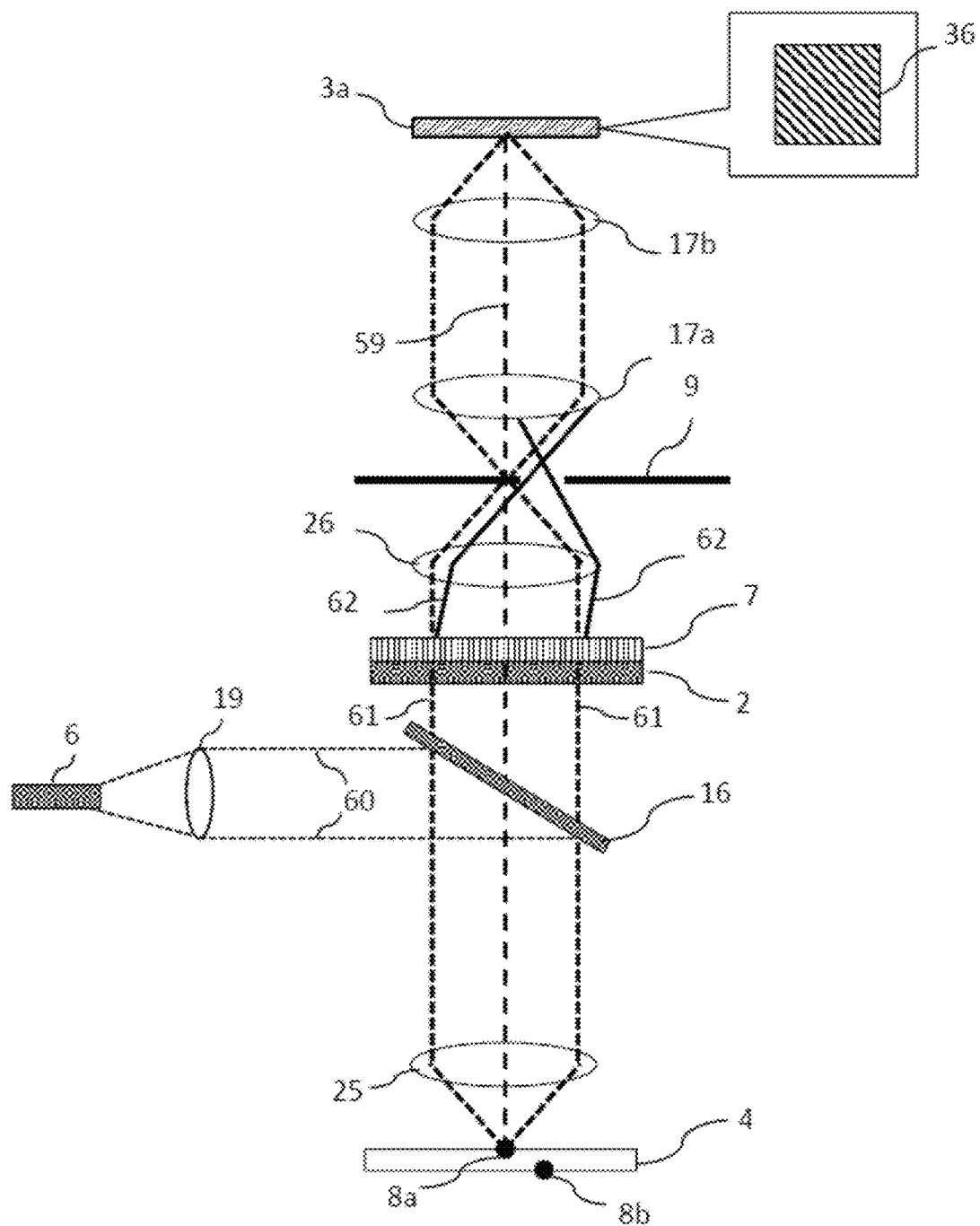
FIG. 8 shows a configuration of a holographic optical system for acquiring a fluorescence three-dimensional image of Embodiment 2.

FIG. 8 shows the configuration of a holographic optical system for acquiring a fluorescence three-dimensional image of this embodiment. The holographic optical system shown in FIG. 8 is an optical system of a reflection type fluorescence microscope.

The measurement object of the observation target sample on the sample stage 4 is illuminated using the He—Ne laser light source 5 of the wavelength 633 (nm), and at the same time, the fluorescence excitation light source 6 of the wavelength 355 nm to 550 nm is used to excite the fluorescence molecules (8a, 8b) of the sample to be observed on the sample stage 4. The excited fluorescence molecules 8a emits fluorescence signal light of a wavelength longer than that of the fluorescence excitation light in the wavelength range of 355 nm to 550 nm, and enter the objective lens 25 together with the fluorescence excitation light reflected on the glass substrate surface of the sample stage 4. The fluorescence excitation light 60 is sufficiently attenuated and the fluorescence signal light 61 is emphasized by using a dichroic mirror 16 that reflects light of a specific wavelength and transmits light of other wavelengths.

Then, using the double-focus lens 2 on which the diffraction grating 7 is superimposed, a fluorescence three-dimensional image is acquired by off-axis self-interference of the fluorescence signal light. Since the fluorescence signal light 61 causes self-interference by the double-focus lens 2, a fluorescence three-dimensional image of a hologram 36 of an equal-angle interference pattern is generated, which is acquired by the image sensor 3 b. From the hologram 36 of the equal-angle interference pattern acquired by the image sensor 3b, the amplitude distribution and the phase distribution of the fluorescence signal light are extracted using the Fourier transformation method. In the off-axis method, the wave front of the fluorescence signal light of the sample to be observed is regenerated by back-propagating to the position of the original fluorescence substance, and the fluorescence signal light can be reconstructed.

Referring to FIG. 9, a case wherein diffraction gratings having different period ($d_1$, $d_2$) structures are superimposed to each focal length ($f_1$ and $f_2$) of the double-focus lenses of this embodiment is explained.

Diffraction gratings having different periodic structures ($d_1$, $d_2$) generate interference between two light waves having two different propagation directions (angles), resulting in interference of two light waves having different traveling directions (angles). Namely, the light of the modulation component of the fluorescence signal light that has passed through the double-focus lens whereon the diffraction gratings having different periodic structures are superimposed becomes two light waves of different diffraction angles, and these two light waves generate interference fringes whether vertical or horizontal. From the interference intensity distribution of this interference stripes, the fluorescence signal light can be reconstructed by a signal processing.

When the fluorescence signal light is reconstructed, only one of the two light waves having different diffraction angles can be used, and the other light wave can be processed as a noise light, so that the S/N ratio can be further improved.

Note that in FIG. 9 (3), what appears to be concentric is a plan view of the double-focus lens on which the diffraction grating is superimposed, and as shown in the enlarged view, grating grooves of the diffraction grating are formed on the lens.

Figure 22:
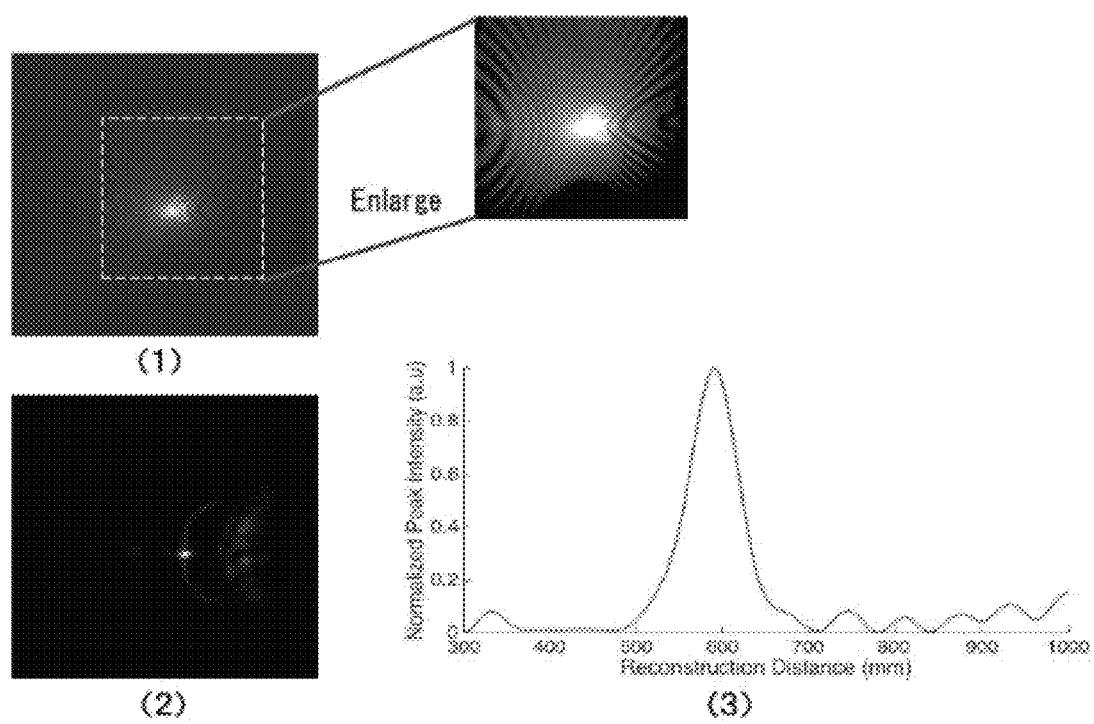
FIG. 22 shows an explanation of reconstructed image of Embodiment 2.

FIG. 22 shows a reconstructed image of a fluorescence three-dimensional image in the holographic optical system of the present embodiment. FIG. 22 (1) shows a hologram. In the part of the dotted line of FIG. 22 (1), an enlarged image wherein the contrast is emphasized is also shown. FIG. 22 (3) is a graph showing the reconstruction image distance (Reconstruction Distance) as the horizontal axis and the intensity (intensity normalized based on the peak intensity) as the vertical axis, and FIG. 22 (2) shows an intensity image at the regenerated surface of the reconstruction image distance of the peak intensity. The intensity image of FIG. 22 (2) is clear and it can be said that the LED light source passing through the pinhole is reproduced because it is a single focusing point.

Embodiment 3

In this embodiment, a digital holographic microscope that can obtain a hologram for a weak fluorescence signal by opening one or a plurality of windows using a DMD element is described.

Figure 12:
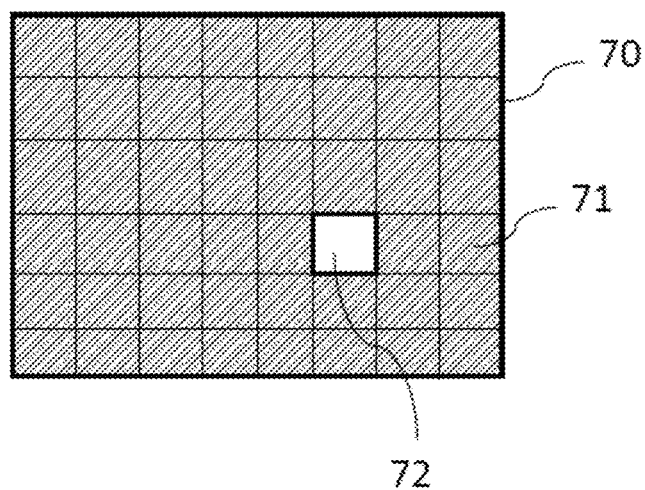
FIG. 12 shows is a conceptual view of a DMD device. (Embodiment 3)

FIG. 12 is a conceptual view of a DMD element. The DMD element is placed on the optical path of a second holographic optical system that acquires a fluorescence three-dimensional image of the observation target sample by a fluorescence excitation light. For example, the DMD element is placed between the lens 17a and the lens 17b in the optical system shown in FIG. 1. Here, a single detector is used as an alternative of the image sensor 3a. In the DMD element, by turning on one or a plurality of micro mirrors, the portion of the micro mirror in the ON state becomes an opening and transmits the fluorescence signal light. The DMD device 70 shown in FIG. 12 is composed of 48 micro-mirrors of vertical 6×horizontal 8, there is one micro-mirror 72 in the ON state, and the other is the micro-mirror 71 in the OFF state. In the DMD element 70, it is clear that the fluorescence signal light is allowed to pass from the position of the micro mirror 72 in the ON state.

As a reconstruction procedure of a fluorescence hologram from a single detector, a single detector is used, the spatial pattern of the fluorescence signal is modulated by the DMD, and light energy of the modulated fluorescence signal is acquired. The hologram pattern is reconstructed on a computer by the method of the compressed sensing from the combination of the modulation pattern by DMD and its light energy. Thus, at a time of application of the fluoresce hologram on a living tissue, by restraining the light energy to be irradiated on the living tissue, the fluorescence signal can be obtained without damaging the living tissue.

Embodiment 4

Figure 13:
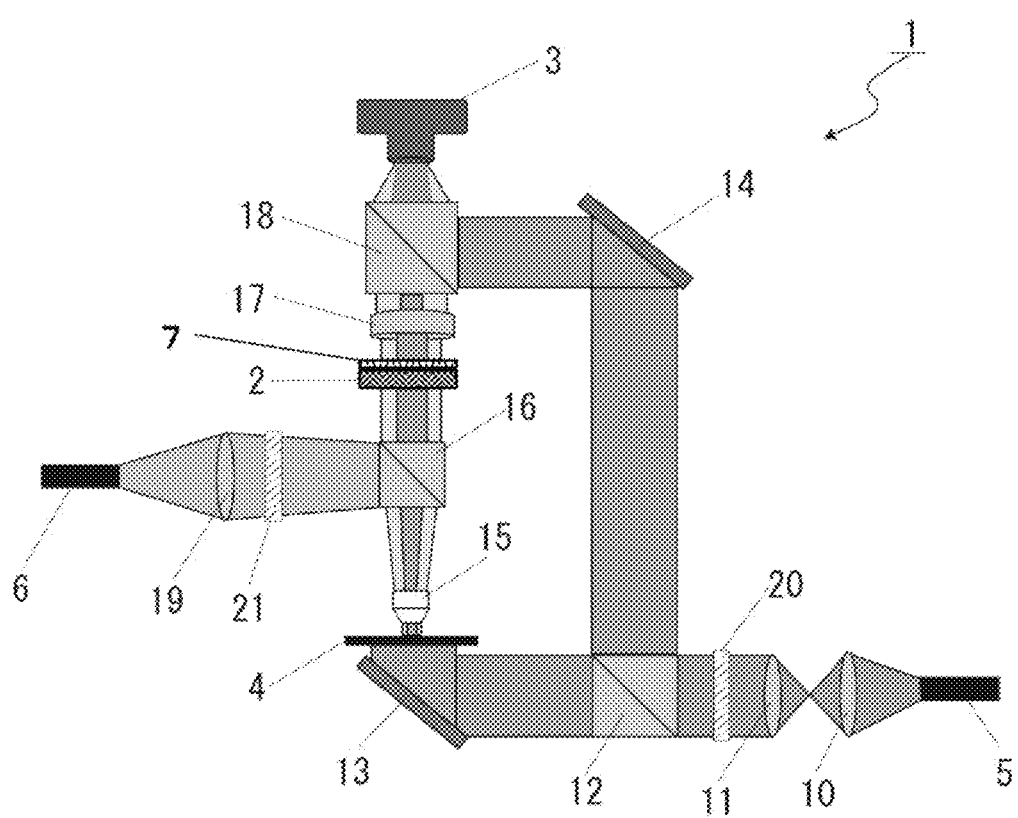
FIG. 13 shows a configuration of a optical system of Embodiment 4 of a digital holographic microscope.

FIG. 13 shows the configuration of the optical system of another embodiment of the digital holographic microscope. The digital holographic microscope shown in FIG. 13 is designed in such a way that two kinds of holograms that are a phase three-dimensional image and a fluorescence three-dimensional images are simultaneously obtained by one imaging means by superimposing an object light and fluorescence signal light coaxially by using two optical systems, one being an optical system of transmission type digital holographic microscope shown in FIG. 14 (the first holographic optical system for acquiring a fluorescence three-dimensional image) and another being an optical system of reflection type fluorescence microscope shown in FIG. 15 (the second holographic optical system for acquiring a fluorescence three-dimensional image), as common optical paths.

Figure 14:
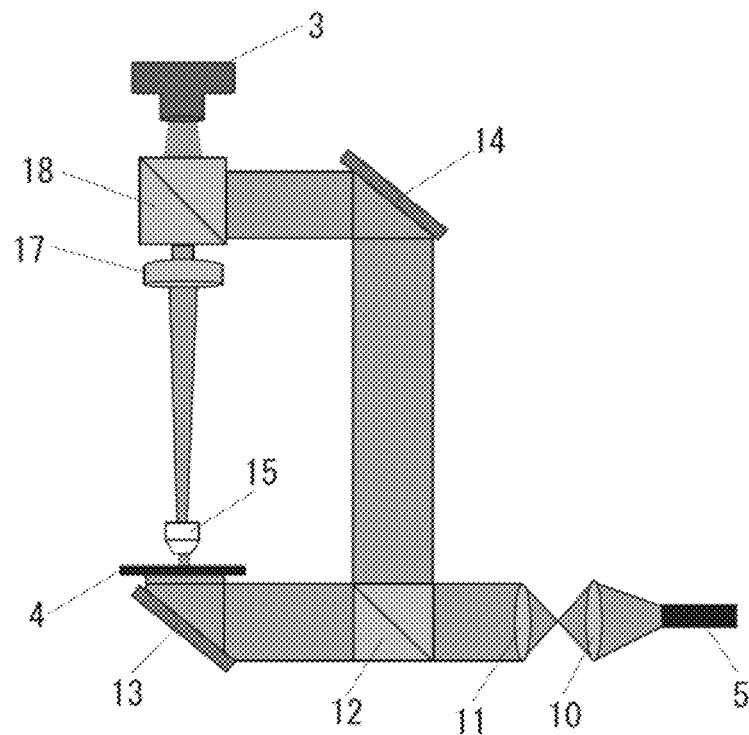
FIG. 14 shows a configuration of an optical system of Embodiment 4 of a first holographic optical system for acquiring a phase three-dimensional image.

The optical system (the first holographic optical system for acquiring a three-dimensional phase image) of the transmission type digital holographic microscope shown in FIG. 14 is described.

The measurement object of the observation target sample on the sample stage 4 is illuminated using the He—Ne laser light source 5 of wavelength 633 (nm). The He—Ne laser light is split by the beam splitter 12 into the path of the object light passing through the measurement object and the path of the reference light without any components, to construct a Mach-Zehnder interferometer. The wavelength 633 (nm) of the He—Ne laser beam transmitted through the measurement object is longer than the wavelength of the excitation laser beam in the wavelength range of 355 nm to 550 nm, and accordingly it is propagated without being influenced by the dichroic mirror 16 and interferes with the reference light again by the beam splitter 18. At this time, an off-axis hologram, namely a hologram of an equal-angle interference pattern is acquired by making a slight angle between the object light and the reference light. From the hologram of the acquired equal-angle interference pattern, the amplitude distribution and the phase distribution of the object light are extracted using the Fourier transformation method. In the off-axis method, by propagating back to the original object position, the wavefront of the object light of the sample to be observed is reproduced, and the object light can be reconstructed.

Figure 15:
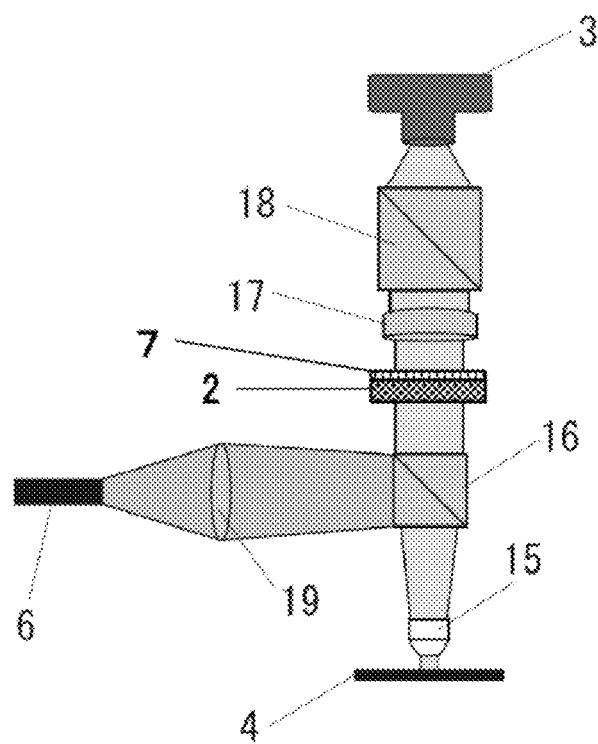
FIG. 15 shows a configuration of the optical system of Embodiment 4 of a second holographic optical system for acquiring a phase three-dimensional image.

Next, an optical system (the second holographic optical system for acquiring a fluorescent three-dimensional image) of the reflection type fluorescence microscope shown in FIG. 15 is described.

The measurement object of the observation target sample on the sample stage 4 is illuminated using the He—Ne laser light source 5 of the wavelength 633 (nm), and at the same time, using the fluorescence excitation light source 6 of the wavelength 355 nm to 550 nm is used to excite fluorescent molecules in the sample to be observed on the sample stage. The excited fluorescence molecule emits fluorescence signal light having a wavelength longer than that of the fluorescence excitation light in the wavelength range of 355 nm to 550 nm, and enters the objective lens 15 together with the fluorescence excitation light reflected on the glass substrate surface of the sample stage 4. The fluorescence excitation light is sufficiently attenuated and the fluorescence signal light is enhanced by using a dichroic mirror 16 that reflects light of a specific wavelength and transmits light of other wavelengths.

Then, using the double-focus lens 2 on which the diffraction grating 7 is superimposed, a fluorescence three-dimensional image is acquired by the self-interference of the fluorescence signal light. Since the fluorescence signal light self-interferes by the double-focus lens 2, the fluorescence three-dimensional image becomes a hologram of a concentric pattern.

The image sensor 3 used as an imaging means acquires two holograms of a phase three-dimensional image and a fluorescence three-dimensional image, simultaneously.

As described above, in the fluorescence three-dimensional image, the interference pattern becomes concentric because the polarization component of the fluorescence causes the self-interference by the double-focus lens 2. On the other hand, the phase three-dimensional image becomes an equal inclination angle interference pattern. The concentric interference pattern and the equal inclination angle interference pattern can be separated in the spatial frequency plane, and from the image captured by the image sensor 3, the phase hologram of the phase three-dimensional image and the fluorescence hologram of the fluorescence three-dimensional image can be spatially separated in the spatial frequency plane.

A half-wave plate 20 is provided so that the light for phase hologram is not influenced by the double-focus lens 2 and the polarization of the light for phase hologram is matched to the polarization direction wherein the said direction not being influenced by the double-focus lens 2. In addition, a half-wave plate 21 is provided to align the polarization direction of the fluorescence excitation light source with the polarization direction wherein the double-focus lens 2 works. Therefore, only the fluorescence signal light generated by the fluorescence excitation light source is influenced by the double-focus lens 2 and further being influenced by the diffraction grating 7, the focusing point deviates from the optical axis.

Here, the signal wherein the phase hologram and the fluorescence hologram are superimposed can be expressed by the following Equation 1.

$$I(x,y) = |o_P(x,y) + r_P(x,y)|^2 + |g(o_F(x,y), f_1) + g(o_F(x,y), f_2)|^2 \quad \text{[Equation 1]}$$

In the Equation 1 above, $o_p$ represents the complex amplitude distribution of the object light wave for phase hologram, and $r_p$ represents the complex amplitude distribution of the reference light wave. Further, OF is a complex amplitude distribution of an object light wave for fluorescence hologram incident on a double-focus lens. Here, $f_1$ and $f_2$ indicate two focal lengths of the double-focus lens. Also, g is a function representing the phase function of the lens and Fresnel diffraction propagation to the imaging surface.

Assuming that $r_p$ is a plane wave represented by the following Equation 2, the phase hologram becomes an off-axis type hologram. Therefore, the extraction of the phase hologram can be performed on the spatial frequency plane by the Fourier transformation of the Equation 1 above.

$$a \exp\{-i(k \sin\theta x + \cos\theta y)\} \quad \text{[Equation 2]}$$

Figure 16:
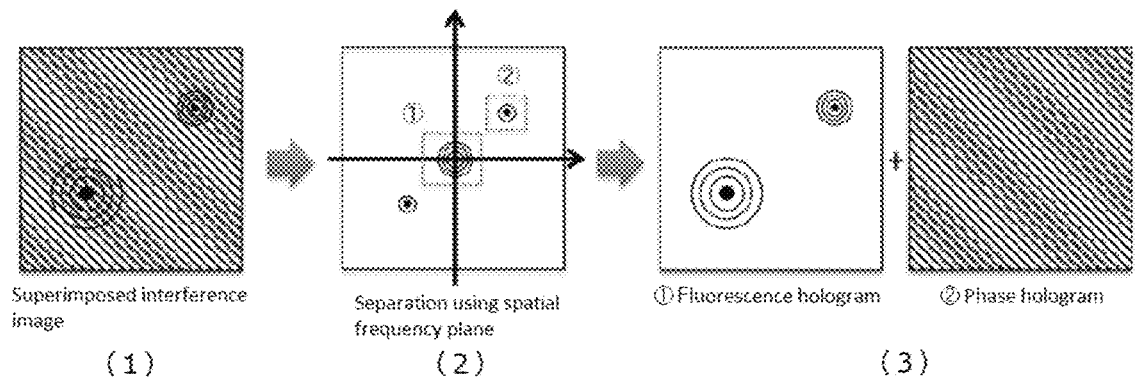
FIG. 16 shows an explanation of separation and reproduction principle of a fluorescence hologram and a phase hologram.

The following Equation 3 shows the result of the Fourier transformation of Equation 1 above. Here, A is the amplitude of the reference beam for the phase hologram. FIG. 16 (1) is an interference image wherein two holograms, a phase hologram and a fluorescence hologram, are superimposed, and the following Equation 3 is made into an illustration. The first, second, fifth, sixth, seventh, and eighth terms on the right side of Formula 3 below are terms due to concentric holograms of self-interference, and are signals appearing near the origin on the spatial frequency surface (see FIG. 16 (2)). Also, the third and fourth terms on the right side are terms due to the off-axis hologram, and become signals present at positions deviated from the origin in the spatial frequency plane (see FIG. 16 (2)). Therefore, by multiplying the window function, two holograms, one being a fluorescence hologram appearing near the origin and another being a phase hologram present at a position deviated from the origin, are separated on the spatial frequency surface. (Refer to FIG. 16 (3)) Therefore, the third and fourth terms of the right side which are terms by the off-axis hologram can be extracted as in the following Equation 4 and Equation 5, respectively.

$$F(f_x, f_y) = O_p(f_x, f_y) * O_p * (f_x, f_y) + \quad \text{[Equation 3]}$$
$$A^2 + AO_p(f_x - k\sin\theta, f_y - k\cos\theta) +$$
$$AO_p * (-f_x - k\sin\theta, -f_y - k\cos\theta) +$$
$$G_1(f_x, f_y) * G_1 * (f_x, f_y) + G_2(f_x, f_y) * G_2 * (f_x, f_y) +$$
$$G_1(f_x, f_y) * G_2 * (f_x, f_y) + G_2(f_x, f_y) * G_1 * (f_x, f_y)$$

$$F_1(f_x, f_y) = AO_p(f_x - k\sin\theta, f_y - k\cos\theta) \quad \text{[Equation 4]}$$

$$F_2(f_x, f_y) = AO_p * (-f_x - k\sin\theta, -f_y - k\cos\theta) \quad \text{[Equation 5]}$$

Here, since the amplitude A of the reference beam for the phase hologram can be measured in advance, the object light $o_p$ of the phase hologram and its complex conjugate distribution can be determined from the Equation 4 and Equation 5, above. The equation 4 above and the equation 5 above are substituted into the equation 3 above to obtain the equation 6 below as a fluorescence hologram.

Here, $G_1$ and $G_2$ in the equation 3 above represent the Fourier transformations of g ($O_F$ (x, y), $f_1$) and g ($O_F$ (x, y), $f_2$), respectively.

$$F_F(f_x, f_y) = F(f_x, f_y) - O_p(f_x, f_y) * O_p * (f_x, f_y) - A^2 - F_1(f_x, f_y) - F_2(f_x, f_y) \quad \text{[Equation 6]}$$

As described above, by conducting the Fourier transformation on the two patterns of the phase hologram and the fluorescence hologram, the component of the equal inclination interference pattern of the signal present at the position shifted from the origin in the spatial frequency plane can be extracted by the band-pass filter. Further, by acquiring the intensity distribution of the reference light used for the equal inclination interference pattern in advance, it is possible to extract only the concentric interference pattern.

Figure 17:
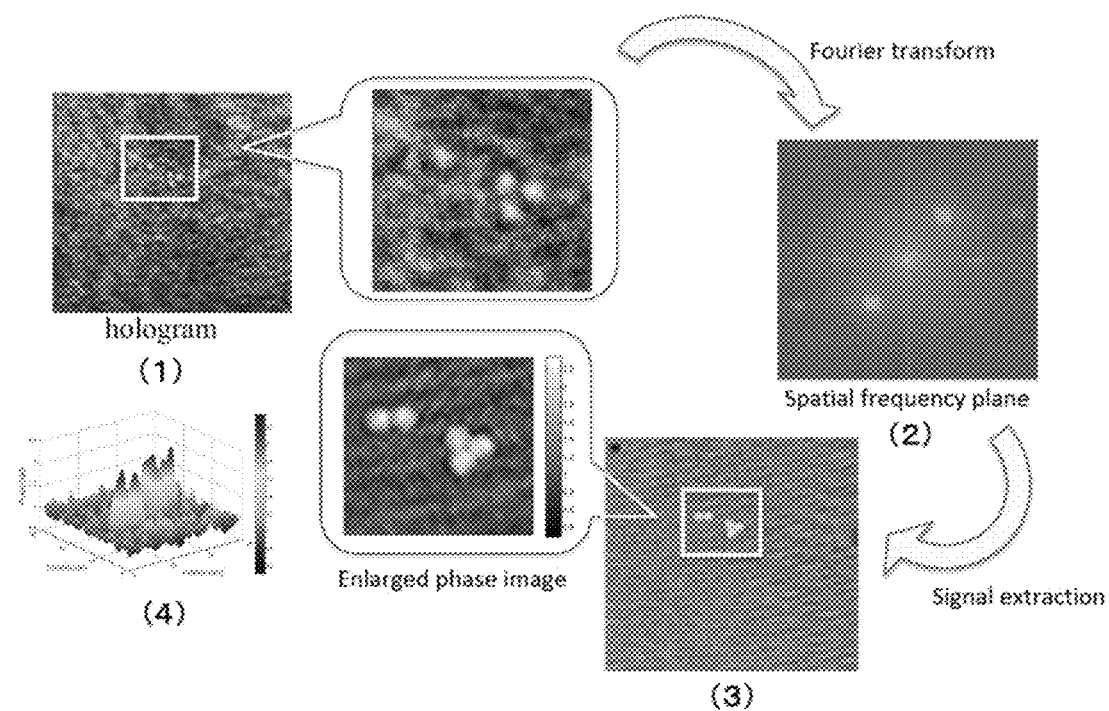
FIG. 17 shows an example of acquired hologram image.

An example of an image of a hologram in which a fluorescence three-dimensional image and a three-dimensional phase image are separately obtained by an image sensor using fluorescence beads with a diameter of 4 μm as a sample to be observed is shown in FIG. 17.

FIG. 17 (1) shows a hologram image of a fluorescent bead (an enlarged view of the fluorescent bead is also appended), which is Fourier transformed to obtain the spatial frequency plane of FIG. 17 (2). The hologram present at a position shifted from the origin of the spatial frequency plane is extracted, and the phase distribution of FIG. 17 (3) is acquired (enlarged phase image is also added). FIG. 17 (4) shows a three-dimensional display of the reconstructed phase distribution. From FIG. 17 (4), the phase change amount of the fluorescent beads can be known.

Embodiment 5

Figure 18:
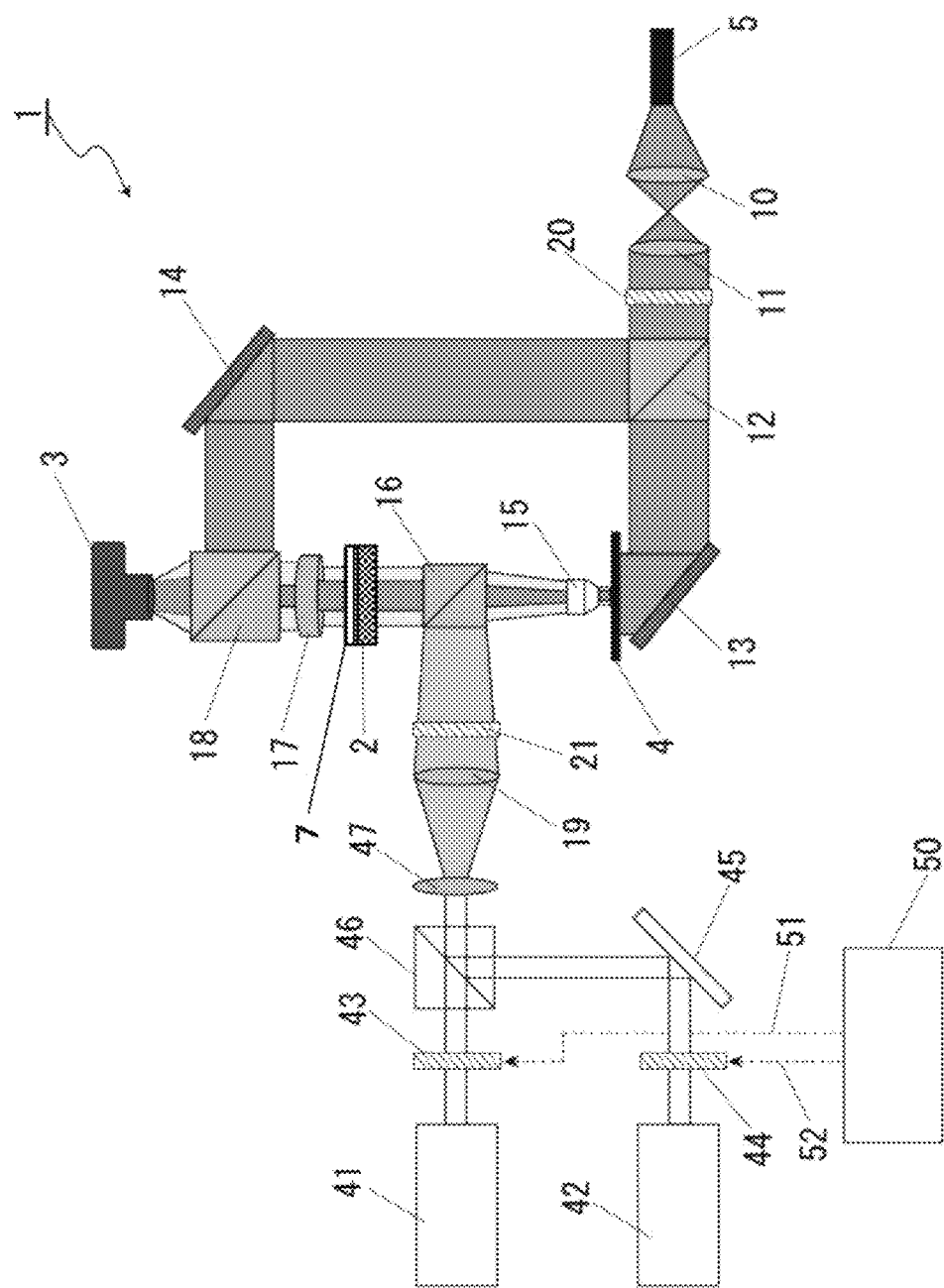
FIG. 18 shows a configuration of an optical system of Embodiment 5 of a digital holographic microscope.

FIG. 18 shows the configuration of the optical system of another embodiment of the digital holographic microscope. Similarly to the digital holographic microscope of Embodiment 5, two optical systems of a transmission type digital holographic microscope and a reflection type fluorescence microscope are used as a common optical path, and an object light and a fluorescence signal light are coaxially superimposed to acquire two holograms that are a phase three-dimensional image and a fluorescence three-dimensional image simultaneously by one imaging means.

The difference from the digital holographic microscope of Embodiment 5 is a fact that two excitation laser light sources (41, 42) are provided. Specifically, a blue laser of the 473 nm wavelength and a green laser of the 532 nm wavelength are provided. The blue laser is mainly intended to excite fluorescence of 500 nm to 530 nm. On the other hand, the green laser mainly aims to excite fluorescence of 540 to 600 nm. It is assumed that the fluorescence markers differ depending on the cells to be observed. Therefore, it is possible to irradiate the observation target sample with a laser of a wavelength at which the fluorescence marker is excited.

In the case of the configuration shown in FIG. 18, the excitation laser light source (41, 42) for exciting the fluorescence molecules of the sample to be observed on the sample stage 4 is switched by the two shutters (43, 44) and the beam splitter 46. The switching of the shutters (43, 44) is performed by shutter control signals (51, 52) output from the shutter control device 50. A ND (Neutral Density) filter 47, which precedes the beam splitter 46, is for reducing the amount of laser light without affecting the color.

The fluorescence molecules of the observation target sample on the sample stage 4 are excited using one of the two excitation laser light sources (41, 42). The excited fluorescence molecule emits a fluorescence signal of a longer wavelength than the excitation laser light source, and enters the objective lens 15 together with the excitation laser light reflected on the surface of the glass substrate of the sample stage 4. Further, the shutter control device 50 switches the two shutters (43, 44) and excites the fluorescence molecules of the sample to be observed on the sample stage 4 using the other excitation laser light source.

Since the fluorescence three-dimensional image of each of the two excitation laser light sources (41, 42) causes self-interference of the polarization component of the fluorescence by the double-focus lens 2, the interference fringes form a concentric pattern.

Although two excitation laser light sources are used in this embodiment, three or more excitation light sources may be used. In addition, the shutter control signal output from the shutter control device may be switched to a higher speed to acquire a fluorescence image.

Simultaneously with the acquisition of the fluorescence three-dimensional image, the measurement object of the observation target sample on the sample stage 4 is illuminated using the He—Ne laser light source 5 of wavelength 633 (nm), the off-axis hologram is generated and two holograms of a phase three-dimensional image and a fluorescence three-dimensional image are acquired by the image sensor 3.

The digital holographic microscope of the present invention can measure the shape change of cells and the movement of cell nuclei in real time, and the shape change and the movement can be measured by selecting the cell to be a target by using the excitation laser light source exchanged according to the type of the fluorescent staining reagent.

In the digital holographic microscope of the above-described embodiment, the first holographic optical system for acquiring the phase hologram is a transmission type, and the second holographic optical system for acquiring a fluorescence hologram is a reflective type, but the second holographic optical system for acquiring a fluorescence hologram may be a transmission type.

INDUSTRIAL APPLICABILITY

The present invention is useful for microscopes in the field of bio-imaging.

DESCRIPTION OF SYMBOLS

1 Digital holographic microscope
2 Double-focus lens
3, 3a, 3b Image sensor
4 Sample stage
5 He—Ne laser light source
6, 41, 42 Excitation laser light source
7 Diffraction grating
8a, 8b Fluorescent molecule
9 Shutter
10, 11, 19, 26, 29 Lens
12, 18, 46 Beam splitter
13, 14, 45 Reflector
15, 25 Objective lens
16, 27 Dichroic mirror
17 Tube lens
20, 21 Half-wave plate
31, 61 Fluorescence signal light
32, 33, 62 Diffracted wave
34 Hologram of concentric pattern
35, 36 Hologram of equal-inclination-angle interference pattern
43, 44 Shutter
47 ND filter
50 Shutter control device
51, 52 Shutter control signal
59 Optical axis of double-focus lens 60 Fluorescence excitation light
70 DMD element
71 Micro-mirror in OFF state
72 Micro mirror in ON state

What is claimed is:

1. A digital holographic microscope comprising a first holographic optical system configured for acquiring a phase three-dimensional image by an interference light superimposing an object light transmitting a sample for observation and a reference light not transmitting a sample, and a second holographic optical system configured for acquiring a fluorescence three-dimensional image by a fluorescence signal light of said sample for observation by using a fluorescence excitation light, and wherein said digital holographic microscope is configured for simultaneously conducting a phase measurement by a first holographic optical system and a fluorescence measurement by a second holographic optical system, wherein said digital holographic microscope is further characterized as follows:
   second holographic optical system has a double-focus lens with a superimposed diffraction grating;
   said double-focus lens and said diffraction grating both have polarization dependence;
   in operation of said digital holographic microscope, said fluorescence signal light is separated from a noise light by said polarization dependence;
   said double-focus lens with superimposed diffraction grating configured to focus said fluorescence signal at a position displaced from an optical axis and auto-interfere for acquiring a fluorescence three-dimensional image.

2. The digital holographic microscope as set forth in claim 1, wherein:
   said fluorescence signal light passing through said double-focus lens is separated into a modulated light component and a non-modulated light component;
   light of modulated component is diffracted by said diffraction grating, skews shifted from the optical axis, passes through a shutter having an opening placed at a position dislocated from the optical axis;
   a noise light of non-modulated light is not diffracted by said diffraction grating, advances straight on the optical axis, and is blocked by said shutter.

3. The digital holographic microscope as set forth in claim 1, wherein:
   said diffraction grating has a periodic structure different from each focus distance of said double-focus lens;
   a light modulation component of said fluorescence signal light passed through said double-focus lens as two light waves having different diffraction angles, thereby improving a signal-to-noise ratio by reconstructing a fluorescence signal light from an interference intensity distribution of an interference fringe of these two optical waves.

4. The digital holographic microscope as set forth in claim 1, wherein
   said double-focus lens includes a double-focus Fresnel lens having subwavelength periodic structure, and is unified with said diffraction grating.

5. The digital holographic microscope as set forth in claim 1, wherein
   the double-focus lens superimposed with said diffraction grating is configured with a liquid crystal spatial light modulation element.

6. The digital holographic microscope as set forth in claim 1, wherein
   said double-focus lens influences the second holographic optical system and does not influence the first holographic optical system.

7. The digital holographic microscope as set forth in claim 1, wherein
   the second holographic optical system includes a display device having micro-mirrors arrayed in a plane, at least one micro mirror being set at an on state having said fluorescence excitation light or said fluoresce signal light transmit partially; wherein by using a single detector as said imaging means, a fluorescence three-dimensional image is acquired.

8. The digital holographic microscope as set forth in claim 1, wherein
   a wavelength of said fluoresce excitation light is changeable.

9. The digital holographic microscope as set forth in claim 1, wherein
   the first holographic optical system is in a transparent mode and the second holographic optical system is in a reflective mode.

10. The digital holographic microscope as set forth in claim 1, wherein:
    the first holographic optical system and the second holographic optical system share an imaging means,
    said imaging means is operable for simultaneously acquiring a fluorescence three-dimensional image and phase three-dimensional image as a hologram;
    said digital holographic microscope configured for separating a fluorescence three-dimensional image of a concentric hologram and a phase three-dimensional image of an equal inclination angle hologram in a spatial frequency plane, and
    reconstructing an object light and fluorescence signal light from each interference intensity distribution.

11. The digital holographic microscope as set forth claim 1, wherein:
    the first holographic optical system and the second holographic optical system share an imaging means;
    said imaging means is operable for acquiring a fluorescence three-dimensional image and phase three-dimensional image simultaneously;
    a fluorescence three-dimensional image of an equal inclination angle hologram by off-axis interference and a three-dimensional image of an equal inclination angle hologram are separated in a spatial frequency plane,
    and an object light and fluorescence light are reconstructed from each interference intensity distribution.

12. The digital holographic microscope as set forth in claim 1
    configured for acquiring time space information of cell nuclei by a fluorescence three-dimensional image and a time space structure of nuclei and cell wall by a phase three-dimensional image, simultaneously.

13. The digital holographic microscope as set forth in claim 1
    configured for simultaneously acquiring time space of information of cell nuclei by a fluorescence three-dimensional image, and a time space structure of cell nuclei and cell walls by a phase three-dimensional image.

14. A digital holographic microscope furnished with a holographic optical system for acquiring a fluorescence three-dimensional image by fluorescence signal light of an observation target sample by using fluorescence excitation light, said digital holographic microscope further characterized as follows:

said holographic optical system having a double-focus lens with a diffraction grating superimposed therewith;

said fluorescence signal separated from noise light using said polarized light dependence;

said separated fluorescence signal light focused at a position deviated from an optical axis by the double-focus lens and said digital holographic microscope configured for acquiring a fluorescence three-dimensional image by having said focused fluorescence signal light auto interfere.

15. The digital holographic microscope as set forth in claim 14, wherein:

said diffraction grating has different periodical structures against each focal distance of said double-focus lens;

a modulation component of said fluorescence signal light passed through said double-focus lens as two optical waves having different diffraction angles;

whereby a signal-to-noise ratio is improved by reconfiguring a fluorescence signal light from interference intensity distribution of an interference fringe of these two optical waves.

16. The digital holographic microscope as set forth in claim 14, wherein said double-focus lens includes a double-focus Fresnel lens of a sub-wavelength periodical structure and is integrated with said diffraction grating.

17. The digital holographic microscope as set forth in claim 14, wherein said double-focus lens and said diffraction grating are integrated with a liquid crystal spatial light modulating device.

* * * * *